United States Patent
Yamane et al.

[11] Patent Number: 6,167,436
[45] Date of Patent: Dec. 26, 2000

[54] DATA ACQUISITION SYSTEM AND STORAGE MEDIUM FOR STORING THE DATA USED IN THE SAME

[75] Inventors: Tetsuya Yamane, Tokyo; Takashi Suzuoka, Kawasaki; Nobuyuki Sawashima, Tokyo, all of Japan

[73] Assignee: Kabushiki Kaisha Toshiba, Kawasaki, Japan

[21] Appl. No.: 08/906,618

[22] Filed: Aug. 5, 1997

[30] Foreign Application Priority Data

Aug. 5, 1996 [JP] Japan ................................. 8-206144

[51] Int. Cl.[7] ................................................. G06F 17/30
[52] U.S. Cl. ........................ 709/213; 709/203; 709/248; 709/224; 709/229; 709/219; 707/10; 340/870; 379/90; 379/100; 379/110
[58] Field of Search ................................. 709/203, 236, 709/224, 248, 219, 229, 207, 217, 218; 340/870; 707/5, 10, 101; 379/90–110

[56] References Cited

U.S. PATENT DOCUMENTS

| | | | |
|---|---|---|---|
| 4,855,906 | 8/1989 | Burke | 364/200 |
| 4,972,367 | 11/1990 | Burke | 364/900 |
| 5,142,623 | 8/1992 | Staable et al. | 709/200.66 |
| 5,471,461 | 11/1995 | Engdahl et al. | 370/17 |
| 5,852,717 | 12/1998 | Bhide et al. | 709/200.33 |
| 5,855,020 | 12/1998 | Kirsch | 707/10 |

*Primary Examiner*—Moustafa M. Meky
*Assistant Examiner*—Hieu C. Le
*Attorney, Agent, or Firm*—Banner & Witcoff, Ltd.

[57] ABSTRACT

A next update prediction time storage section receives the present time from a clock section and transfers part or all of the links whose corresponding next update prediction times are earlier than the present time to a transmission/reception section. The transmission/reception section communicates via a network and acquires the data specified by a link. An update history storage section extracts the latest update time when information on the latest update time exists in the acquired data. The update history storage section adds the extracted latest update time to the update history corresponding to the link and calculates the next update prediction time from the added and updated update history. The update history storage section sends the calculated next update prediction time to the next update prediction time storage section. The next update prediction time storage section replaces the next update prediction time corresponding to the link with the calculated next update prediction time. A link extraction section extracts the link group from the transferred data and transfers the link group to a link stack section. The link stack section sends each of the extracted link groups to the next update prediction time storage section, only when it has not been registered yet.

17 Claims, 18 Drawing Sheets

FIG. 7A

| NEXT UPDATE PREDICTION TIME | LINK | HISTORY TABLE |
|---|---|---|
| 7/1 12:00 | http://www.a.co.jp/ | HT1 |
| 7/1 17:00 | http://www.a.co.jp/b/ | HT2 |
| 7/1 20:00 | http://www.a.co.jp/c/ | HT3 |
| 7/1 20:00 | http://www.x.or.jp/ | HT4 |

HISTORY TABLE HT1

| DATA ACQUISITION | UPDATE TIME |
|---|---|
| 6/30 12:00 | — |
| 6/29 12:00 | — |
| 6/28 12:00 | 6/28 12:00 |

FIG. 7B

| NEXT UPDATE PREDICTION TIME | LINK | HISTORY TABLE |
|---|---|---|
| 7/3 12:00 | http://www.a.co.jp/ | HT1 |
| 7/1 17:00 | http://www.a.co.jp/b/ | HT2 |
| 7/1 20:00 | http://www.a.co.jp/c/ | HT3 |
| 7/1 20:00 | http://www.x.or.jp/ | HT4 |

HISTORY TABLE HT1

| DATA ACQUISITION | UPDATE TIME |
|---|---|
| 7/1 12:00 | 7/1 12:00 |
| 6/30 12:00 | — |
| 6/29 12:00 | — |
| 6/28 12:00 | 6/28 12:00 |

FIG. 7C

| NEXT UPDATE PREDICTION TIME | LINK | HISTORY TABLE |
|---|---|---|
| 7/1 12:00 | http://www.a.co.jp/ | HT1 |
| 7/1 17:00 | http://www.a.co.jp/b/ | HT2 |
| 7/1 20:00 | http://www.a.co.jp/c/ | HT3 |
| 7/1 20:00 | http://www.x.or.jp/ | HT4 |

HISTORY TABLE HT1

| DATA ACQUISITION | UPDATE TIME |
|---|---|
| 7/1 12:00 | 7/1 12:00 |
| 6/30 12:00 | — |
| 6/29 12:00 | — |
| 6/28 12:00 | 6/28 12:00 |

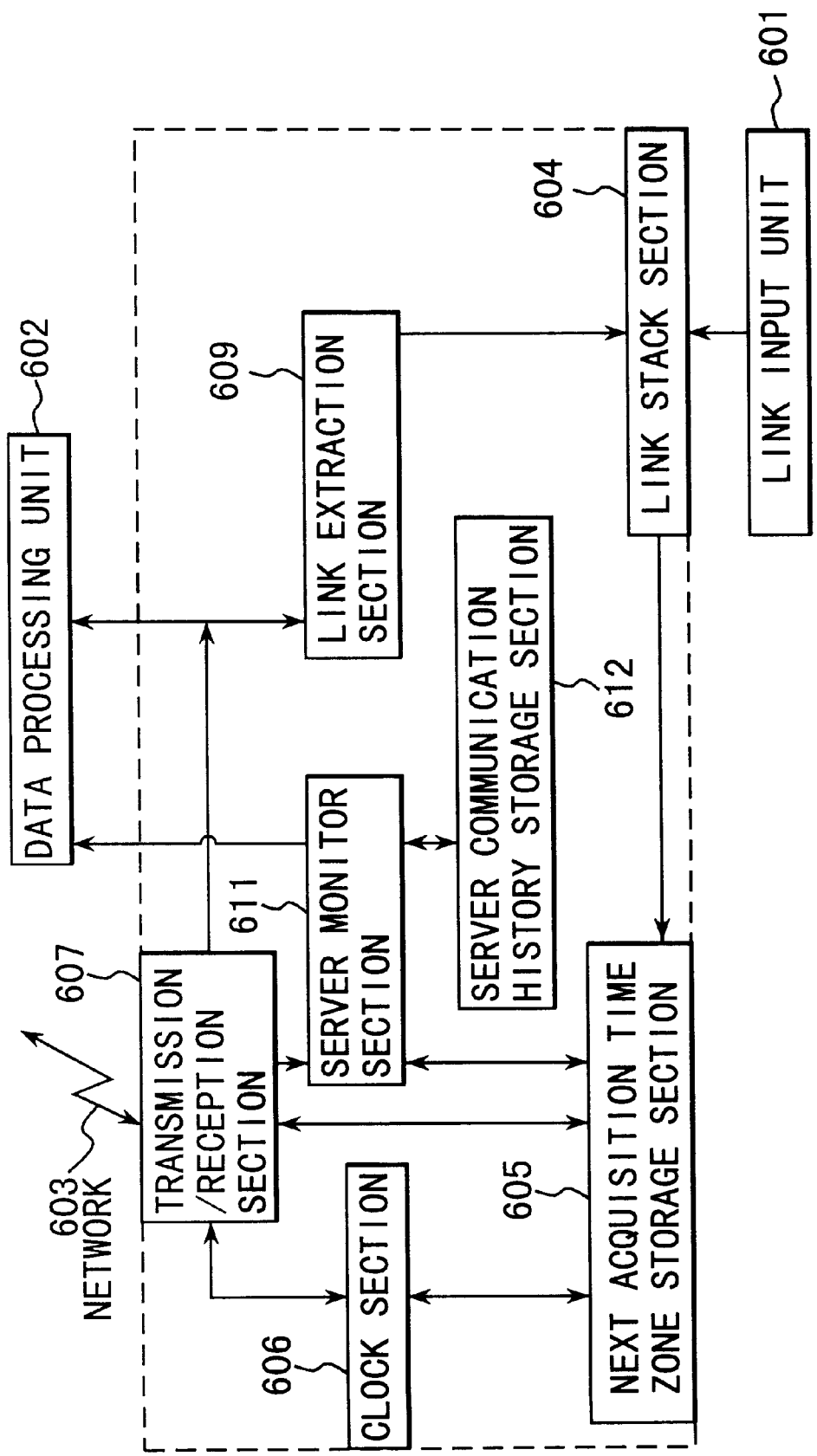
F I G. 17

DATA ACQUISITION SYSTEM AND STORAGE MEDIUM FOR STORING THE DATA USED IN THE SAME

BACKGROUND OF THE INVENTION

This invention relates to a data acquisition system for acquiring the data dispersed over a network and varying with time and a storage medium for storing the data used in the system.

There is a system called a network robot, which acquires data items dispersed over a network by referring to links in the data items in a chain reaction.

Regarding the network robot, some of the technical words used in the present specification will be explained.

"Link" is a word for specifying a specific data item on a network. "Hyperlink" is sometimes used for the same meaning.

"Link group" means a set of one or more links.

"Initial link group" means a link group used as the initial value when a network robot starts to operate.

"Pre-acquisition mode" is one of the attributes attached to a link (in a recording storage section that records and stores links) and signifies that the acquisition of the data item specified by the link has not been completed.

"Post-acquisition mode" is one of the attributes attached to a link (in a recording storage section that records and stores links) and signifies that the acquisition of the data item specified by the link has been completed.

Next, explanation of a conventional network robot will be given.

With a conventional network robot, an initial link group is entered from a link input unit provided independently of the network robot. The initial link group is stored in a specific storage section.

The network robot acquires the data specified by the link in the pre-acquisition mode by performing network communication with only links in the preacquisition mode in the stored link groups. The mode of the link for which the data has been acquired is changed to the post-acquisition mode.

Furthermore, with the network robot, link groups are extracted from the acquired data items. Each of the extracted link groups is stored in the storage section, when it does not overlap with the links already stored in the storage section.

From this point on, such processes are repeated until the links stored in the pre-acquisition mode have disappeared. Then, the network robot terminates the processing.

Such a network robot has been disclosed in "The Web Navigator, Paul Gilster, Wiley Computer Publishing" and "UNIX Web Server Book Second Edition, R. Douglas Matthews et al, Ventana".

Such a conventional network robot, however, has various problems as shown below, for example:

(1) Even when the contents of the data have been updated, they cannot be acquired immediately.

(2) In contrast to item (1), although the contents of the data have not been updated, they may be acquired, resulting in the execution of useless data acquisition. This lowers the processing efficiency.

(3) When the data is acquired, it is impossible to carry out a flexible process according to the dynamic load on the network and the frequency of update of the data, putting a limit on the efficiency and speed of data acquisition.

For example, it is assumed that data group D1 exists in server group A whose data acquisition speed gets slower from 12:00 to 14:00 (hereinafter, referred to as time zone SA) because the network load is heavier during the period. In this case, when many items in data group D1 are always acquired during time zone SA, the time required to get data items is longer, although the data acquisition in data group D1 is fast outside time zone SA, forcing the data acquisition process constantly under a high load.

BRIEF SUMMARY OF THE INVENTION

An object of the present invention is to provide an information acquisition system capable of acquiring data at almost the same frequency as that of update of each data item in acquiring data items dispersed on a network and a storage medium that stores the information used in the system.

A second object of the present invention is to provide an information acquisition system capable of suppressing the unnecessary acquisition of unupdated data items beforehand and a storage medium that stores the information used in the system.

A third object of the present invention is to provide an information acquisition system capable of acquiring each data item and accessing the server that stores the data items at the optimum time or in the optimum time zone and a storage medium that stores the information used in the system.

According to an aspect of the present invention, there is provided an information acquisition method comprising the steps of: acquiring data specified by a link according to time information; determining whether or not the acquired data is updated; and updating the time information according to a result at the determining step.

According to a second aspect of the present invention, there is provided a computer program product comprising: a computer usable medium having computer readable program instruction means embodied in the medium for causing a computer to execute data acquisition optimally, the computer program product having: first computer readable instruction means for causing the computer to acquire data specified by a link according to time information; second computer readable instruction means for causing the computer to determine whether or not the acquired data is updated; and third computer readable instruction means for causing the computer to update the time information according to a result by the second computer readable instruction means.

According to a third aspect of the present invention, there is provided an information acquisition system comprising: acquiring means for acquiring data specified by a link according to time information; determining means for determining whether or not the acquired data is updated; and updating means for updating the time information according to a determination result by the determining means.

With this, data items whose update interval is short are adjusted so that the data acquisition interval may be shorter, and data items whose update interval is long are adjusted so that the data acquisition interval may be longer. These adjustments are made dynamically.

With the present invention, when data items dispersed on the network are acquired, data items can be acquired at almost the same frequency as that of update of each data item.

Furthermore, with the present invention, the unnecessary acquisition of unupdated data items can be suppressed beforehand. In addition, the acquisition of the data and access to the server holding the data can be performed at the optimum time or in the optimum time zone.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 7A to 7C show tables to help explain the processing in FIG. 6 concretely;

FIG. 17 is a block diagram of an information acquisition system according to a sixth embodiment of the present invention, being accompanied by peripheral devices.

DETAILED DESCRIPTION OF THE INVENTION

Hereinafter, referring to the accompanying drawings, embodiments of the present invention will be explained.

A first embodiment of the present invention will be described.

Figure 1:
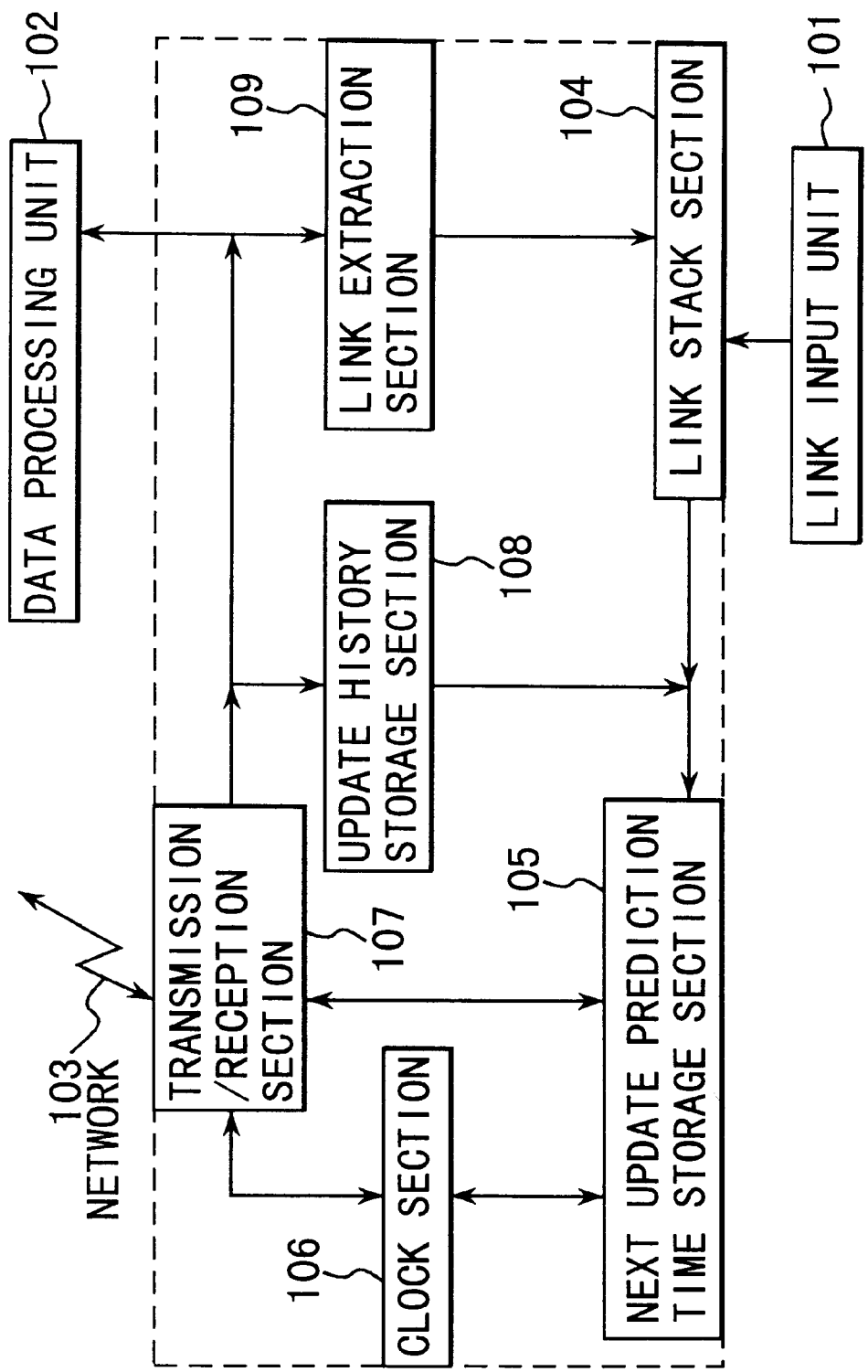
FIG. 1 is a block diagram of an information acquisition system according to a first embodiment of the present invention, being accompanied by peripheral devices.

FIG. 1 is a block diagram of an information acquisition system (a network robot) according to the first embodiment. In the figure, the component parts enclosed by the dotted line constitute the information acquisition system.

A link input unit 101, a data processing unit 102, and a network 103 are provided independently of the information acquisition system. The link input unit 101 has the function of receiving from the operator an initial link group referred to in the initial operation of the information acquisition system and sending it to the information acquisition system. The data processing unit 102 performs various processes using the data items received during the operation of the information acquisition system. The network 103 is a communication medium between servers with which the information acquisition system communicate.

Now, the configuration of the information acquisition system of FIG. 1 will be explained. The information acquisition system comprises a link stack section 104, a next update prediction time storage section 105, a clock section 106, a transmission/reception section 107, an update history storage section 108, and a link extraction section 109.

The link stack section 104 has a data structure capable of storing as many links as desired. For example, it is realized by having a list structure that has links as elements in it.

The next update prediction time storage section 105 has the function of relating a link to the next update prediction time of the data item specified by the link, storing them, and outputting and updating the next update prediction time.

The clock section 106 outputs the present time in operation.

The update history storage section 108 relates a link to the update history (history table) of the data item specified by the link and stores them. The update history storage section 108 has the function of adding the update history and the function of calculating the next update prediction time of each link from the update history corresponding to each link.

The transmission/reception section 107 transmits and receives various types of data items to and from the network 103.

The link extraction section 109 extracts a link from the data or a hypertext, part of the data.

Here, the information stored in the next update prediction time storage section 105 and the update history storage section 108 will be explained.

Figure 2:
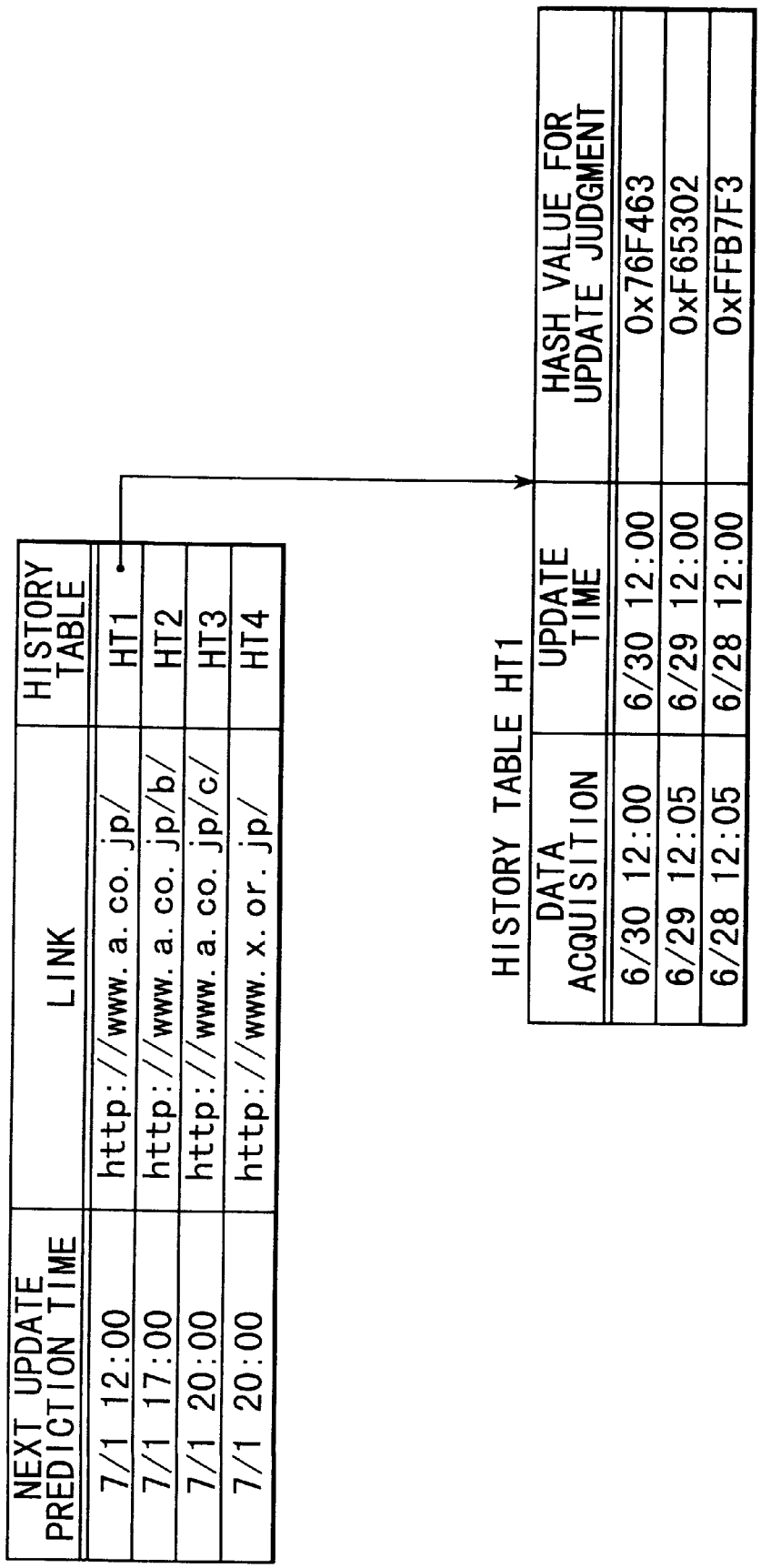
FIG. 2 shows tables to help explain the links stored in the information acquisition system of FIG. 1 and information about the links.

Since all the pieces of the information stored in these storage sections are related through links, the next update prediction time storage section 105 and the update history storage section 108 may not have physically different storage units. Therefore, they are stored in a common storage unit so as to have the relationship as shown in FIG. 2.

First, the next update prediction time to be outputted and updated by the next update prediction time storage section 105 is stored so as to correspond to each link. As shown in FIG. 2, four next update prediction times, July 1 12:00, July 1 17:00, July 1 20:00, July 1 20:00, are stored so as to correspond to four links (http://www.a.co.jp/, http://www.a.co.jp/b/, http://www.a.co.jp/b/, http://www.x.or.jp/), respectively, in table form. Furthermore, history tables HT1 to HT4 are stored for these four links, respectively. FIG. 2 shows an example of history table HT1 corresponding to link (http://www.a.co.jp/). As shown in the example, in the history table, the acquisition time indicating the time at which the data has been acquired, the time at which the data has been updated, and hash values for update judgment are stored in table form. As described earlier, these history tables are used by the update history storage section 108 for addition and the calculation of the next update prediction time.

Figure 3:
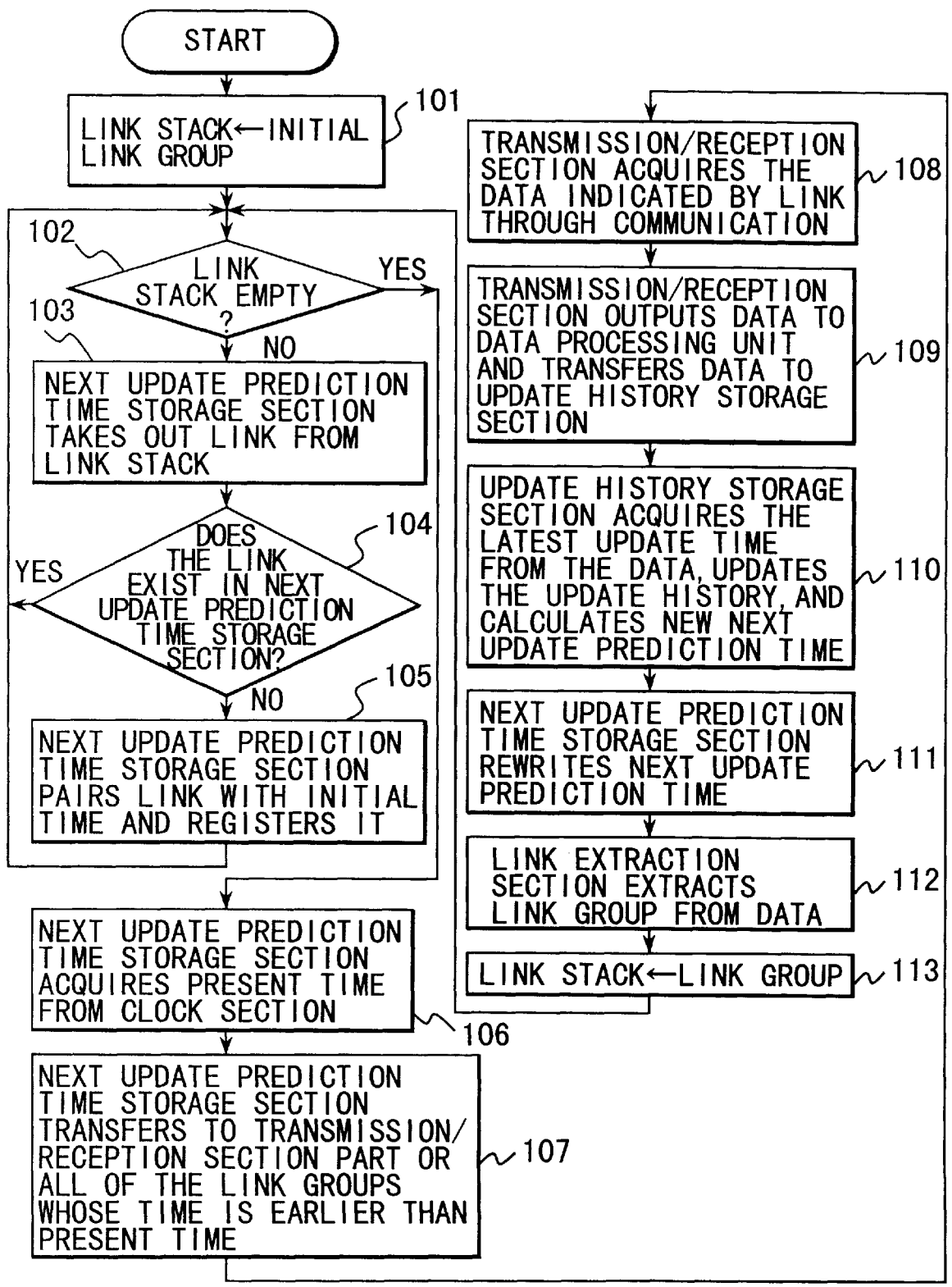
FIG. 3 is a flowchart for the overall operation of the information acquisition system of FIG. 1.

The overall operation of the information acquisition system of the first embodiment will be descried by reference to the flowchart of FIG. 3.

First, the link stack section 104 in the information acquisition system receives the initial link group transferred from the link input unit 101 (step S101). The link stack section 104 transfers each link group sent in step S101 or step S112 (explained later) to the next update prediction time storage section 105 (steps S102, S103).

If the link transferred at step S103 has not been registered, the next update prediction time storage section 105 relates the link to the next update prediction time (the initial time) and stores it as shown in FIG. 2 (steps S104, S105).

In the first embodiment, it is assumed that the time when the information acquisition system is started up is used as the initial time. The value of the initial time can be compared with the output of the clock section 106. The initial time may take any value as long as it is not later than the time outputted from the clock section 106 at least at that time. For instance, the oldest time may be used as the initial time.

Next, at step S102, when the data link stack gets empty, the next update prediction time storage section 105 gets the present time from the clock section 106 (step S106). Instead of the next update prediction time storage section 105 asking the clock section 106 for the present time, the clock section 106 may automatically transfer information on the present time to the next update prediction time storage section 105.

The next update prediction time storage section 105 transfers to the transmission/reception section 107 part or all of the links whose corresponding next update prediction times are earlier than the time transferred at step S106 (step S107).

The transmission/reception section 107 makes communication through the network 103 and acquires the data specified by the link transferred at step S107 (step S108).

Regarding data acquisition, a default value may be set beforehand and, when it is found before communication or in the course of communication control that data items whose values are larger than the default value are to be acquired, only those from the beginning up to a specific value may be actually acquired.

Moreover, of the data items, those including no link may not be acquired, thereby reducing the actually acquired data size.

The transmission/reception section 107 outputs the data acquired at step S108 to the data processing unit 12 and to the update history storage section 108 and link extraction section 109 (step S109). At that time, the order of output and transfer is not limited.

When information on the latest update time exists in the data transferred at step S109, the update history storage section 108 extracts the latest update time. Next, the update history storage section 108 adds the extracted latest update time to the update history corresponding to the link transferred to the transmission/reception section 107 at step S107 and calculates the next update prediction time from the additionally updated update history (step S110). The process at step S111 will be explained in detail later.

The update history storage section 108 transfers the next update prediction time calculated at step S110 to the next update prediction time storage section 105.

The next update prediction time storage section 105 replaces the preceding update prediction time corresponding to the link transferred to the transmission/reception section 107 at step S107 with the next update prediction time calculated at step S110.

The link extraction section 109 extracts the link group from the data transferred at step S109 (step S112) and transfers it to the link stack section 104. The link stack section 104 stores the transferred link group (step S113).

The processes at steps S112 and S113 may be carried out independently of the processes at steps S110 and S111.

Thereafter, control returns to step S102. As described earlier, the link stack section 104 sends each of the link groups extracted at step S112 to the next update prediction time storage section 105, only when the link has not been registered in the next update prediction time storage section 105. In response to this, the next update prediction time storage section 105 pairs each received link with the initial time and registers the pair (steps S102 to S105).

From this time on, in the information acquisition system, the aforementioned processes are performed repeatedly.

Figure 4:
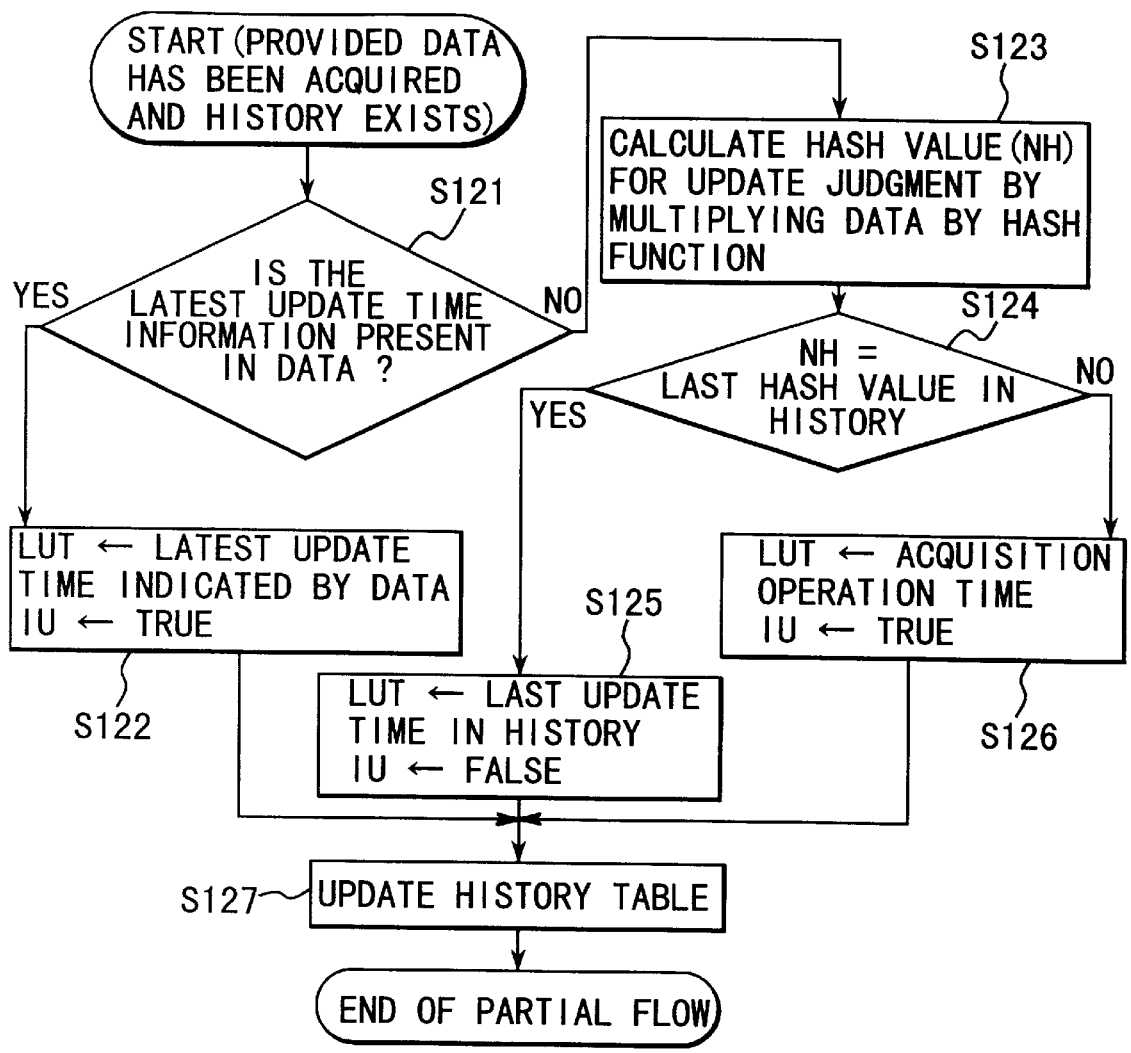
FIG. 4 is a flowchart to help explain the process of extracting the latest update time and the process of judging whether or not the data has been updated in the information acquisition system of FIG. 1.
Figure 5A:
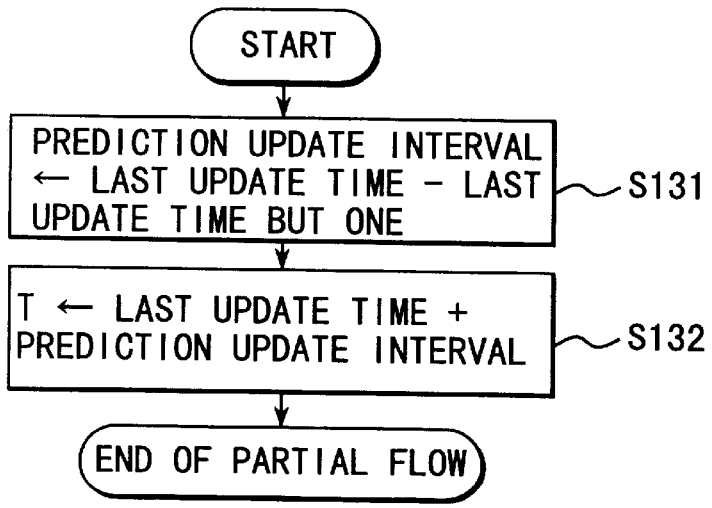
FIGS. 5A and 5B are flowcharts for the process of calculating the next update prediction time in the information acquisition system of FIG. 1.
Figure 5B:
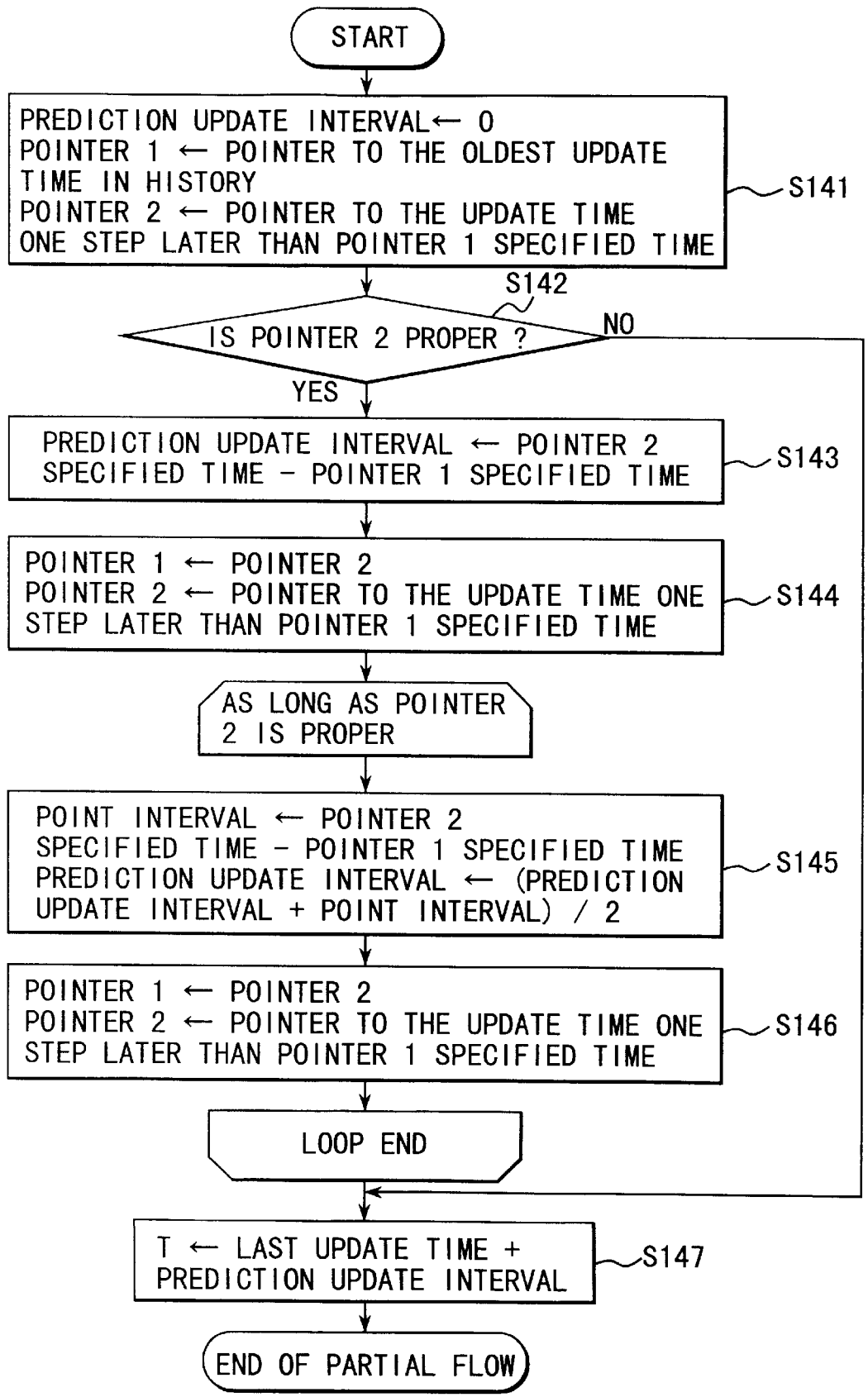
Figure 6:
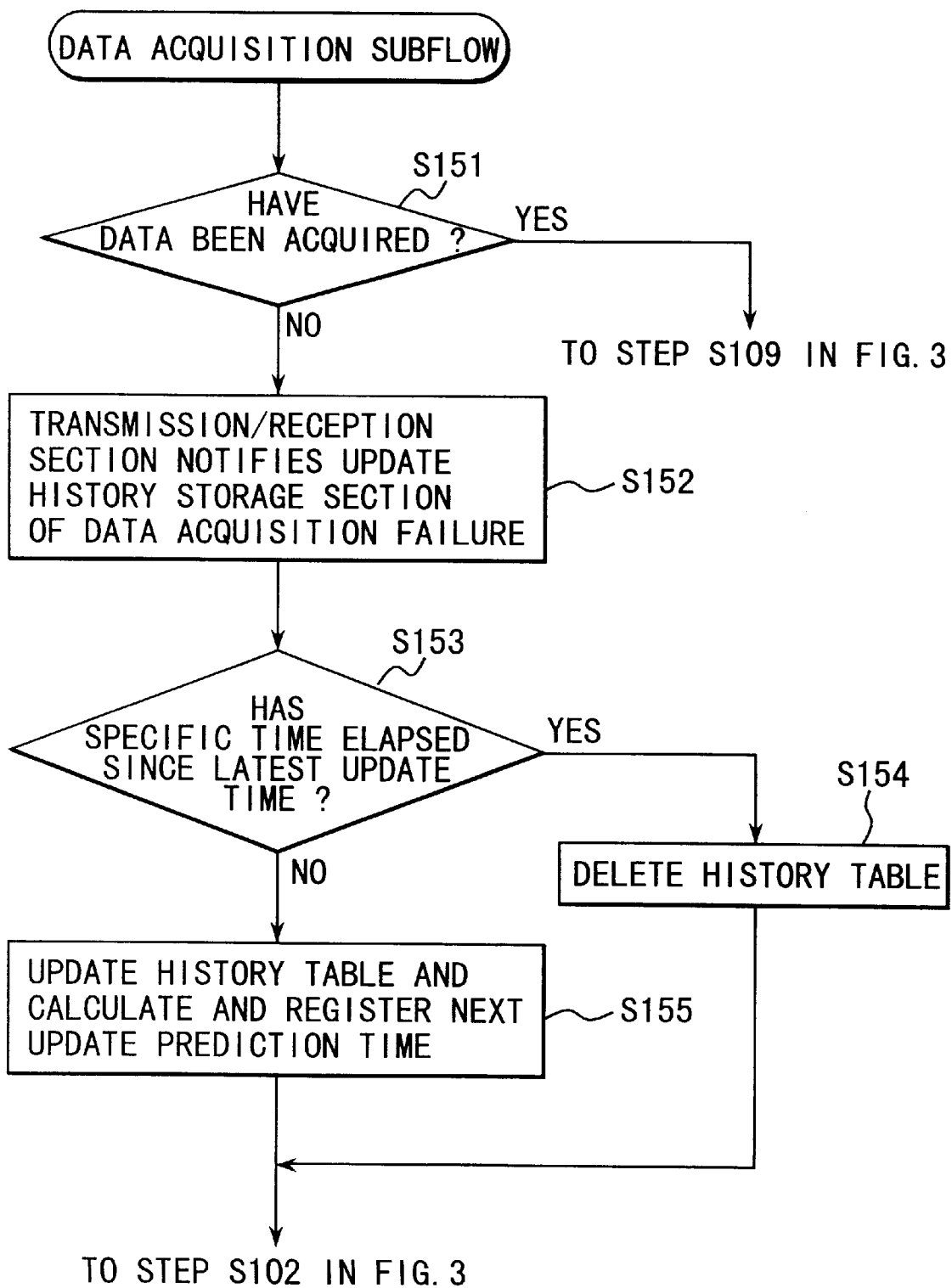
FIG. 6 is a flowchart for the processing at the time when the data specified by the link could not be obtained in the information acquisition system of FIG. 1.

Now, the process of the update history storage section 108 at step S110 will be described in detail by reference to FIGS. 4, 5A, and 5B.

At step S110, the update history storage section 108 executes roughly three processes. A first process is to extract the update time from the acquired data, a second process is to determine whether or not the acquired data has been updated, and a third process is to calculate the next update prediction time from the update history.

The first and second processes will be described by reference to the flowchart of FIG. 4. It is assumed that the data indicated by the desired link has been acquired and a history table has already been formed for the link. The latest update time is determined to be variable LUT and the judgment result about the presence or absence of update is determined to be variable IU.

The update history storage section 108 determines at steps S108, S109 whether or not information on the latest update time exists in the transferred data (step S121). When information on the latest update time exists (YES at step S121), the latest update time in the information is set in variable LUT and data indicating the judgment result of the presence of update (true) is set in variable IU (step S122).

At step S121, when information on the latest update time does not exist (NO at step S121), the update history storage section 108 multiplies the acquired data by a hash function to obtain a hash value for update judgment (NH) (step S123). Thereafter, the update history storage section 108 determines whether or not the calculated NH is equal to the hash value corresponding to the latest update time in the history table corresponding to the desired link (step S124).

At step S124, when the calculated hash value for update judgment is equal to the hash value corresponding to the latest update time registered in the history table (YES in step S124), the latest update time registered in the history table is set in variable LUT and data indicating the judgment result of the absence of update (false) is set in variable IU (step S125).

At step S124, when the calculated hash value for update judgment is unequal to the hash value corresponding to the latest update time registered in the history table (NO in step S124), the data acquisition operation time is set in variable LUT and data indicating the judgment result of the presence of update (true) is set in variable IU (step S126).

After the process of any one of steps S122, S125, and S126 has been carried out, the update history storage section 108 registers the acquisition time, the update time, and the hash value for update judgment in the history table according to the set variable LUT and variable IU. When variable IU is false, no new entry is registered in the history table.

By the above processes, the update history storage section 108 executes the process of extracting the update time from the acquired data (the first process) and the process of judging whether or not the acquired data has been updated (the second process).

While at step S124, a hash value is used in judging whether or not the data has been updated, the present invention is not restricted to this. For instance, check sum or the acquired data (part of the data) itself may be used.

At step S126, the time that the data acquisition was started or the time that the data was acquired by the communication processing may be used as the acquisition operation time set in variable LUT.

There is a case where the data is in the form that indicates that the contents specified by a link practically do not exist. In this case, the latest update time at that time may be the present time from the clock section 106 or the time at step S106.

Regarding a link indicating no practical data, there is a method of leaving such a link as an object of reference without deleting it from the update history storage section 108 and the next update prediction time storage section 105. For instance, in order that the data may be updated on the server side, when an attempt is made to acquire the data that cannot be acquired temporarily, a link indicating no practical data will occur. In such a case, after the update work on the server side has finished, the data can be acquired. Therefore, leaving such a link as an object of reference is effective in accessing the data.

Because the stop of data offering or long interruption may cause links indicating no practical data, links that have indicated no practical data for more than a specified period of time may be deleted from the update history storage section 108 and the next update prediction time storage section 105.

Furthermore, links indicating no practical data may be deleted immediately from the update history storage section 108 and the next update prediction time storage section 105 to save the memory space.

Now, the process of the update history storage section 108 calculating next update prediction time T from the update history (the third process) will be described by reference to FIGS. 5A and 5B.

First, the process of calculating the first next update prediction time will be explained by reference to FIG. 5A. It is assumed that the data specified by the desired link has been acquired and the history table corresponding to the link has been updated according to the process shown in FIG. 4, for example, and that the number of entries in the history table is a specific value or more.

The update history storage section 108 calculates a prediction update interval by subtracting the next latest update time from the latest update time registered in the history table (step S131). Thereafter, the update history storage section 108 calculates next update prediction time T by adding the prediction update interval calculated at step S131 to the latest update time. The calculated next update prediction time T is sent to the next update prediction time storage section 105.

A concrete example of calculating next update prediction time T shown in FIG. 5A will be explained using the history table of "http://www.a.co.jp/", shown in FIG. 2. The present time is assumed to be 12:01, June 30.

As seen from history table HT1 of FIG. 2, the latest update time $T_0$ is 12:00, June 30. The next latest update time $T_1$ is 12:00, June 29.

From $T_0$–$T_1$, the prediction update interval is 24:00. Therefore, the next update prediction time T is determined to be 12:00, July 1 using the following equation:

$$T=T_0+(T_0-T_1)$$

Next, the process of calculating the second next update prediction time with the update history storage section 108 will be explained by reference to FIG. 5B. The process of calculating the second next update prediction time is an example of calculating the next update prediction time using all of the entries registered in the update table. As in the process of calculating the first next update prediction time, it is assumed that the data specified by the desired link has been acquired and the history table corresponding to the link has been updated according to the process shown in FIG. 4, for example, and that the number of entries in the history table is a specific value or more (two or more in the second calculation process).

First, the update history storage section 108 sets "0" in the prediction update interval, the pointer value indicating the oldest update time of the entries registered in the history table in pointer 1, and the next oldest update time in pointer 2 (step S141).

Thereafter, the update history storage section 108 determines whether or not the update time in pointer 2 is proper (step S142). Whether or not the update time is proper means whether or not the update time represents an update time registered in the history table. If the history table has two or more entries, the update time set in pointer 2 at step S141 is an update time registered in the history table, so the result at step S142 is YES.

After the result at step S142 has shown YES, the update history storage section 108 subtracts the update time in pointer 1 from the update time in pointer 2 and sets the subtraction result in the prediction update interval (step S143). After the prediction update interval has been set, the update history storage section 108 sets the pointer value of pointer 2 in pointer 1 and the pointer value representing the latest update time of pointer 1 but one in pointer 2 (step S144).

After the process at step S144, the processes at steps S145, S146 are executed repeatedly, as long as the update time in pointer 2 is proper.

At step S145, the update time in pointer 2 is subtracted from the update time in pointer 1 and the subtraction result is set in the point interval. The prediction update interval is added to the point interval and the addition result is halved. The halved result is set as a new prediction update interval. After these processes, as in the process at step S144, the update history storage section sets the pointer value of pointer 2 in pointer 1 and the pointer value representing the latest update time of pointer 1 but one in pointer 2 (step S146).

If at step S146, when the update time to be set in pointer 2 does not exist in the history table, a specific value unable to exist in the history table will be set.

When the update time in pointer 2 is improper (NO at step S142 or when the update time in pointer 2 is improper in the loop at steps S145, S146), the update history storage section 108 adds the prediction update time interval to the latest update time registered in the history table and sets the addition result in next update prediction time T (step S147).

By the above processes, next update prediction time T is calculated and the calculated update prediction time T is sent to the next update prediction time storage section 105.

A concrete example of calculating next update prediction time T shown in FIG. 5B will be explained using the history table of "http://www.a.co,jp/" shown in FIG. 2. The present time is assumed to be 12:01, June 30.

As seen from history table HT1 of FIG. 2, the latest update time $T_0$ is 12:00, June 30. The second latest update time $T_1$ is 12:00, June 29. The third latest update time $T_2$ is 12:00, June 28.

From $T_0-T_1=24:00$ $T_1-T_2=24:00$ the average of intervals (the prediction update time interval) $D_t$ will be:

$$D_t=((T_0-T_1))+(T_1-T_2))/2=24:00$$

Therefore, the next update prediction time will be determined using the following equation:

$$T=T_0+D_t$$

As a result, 12:00, July 1 will be given.

The present invention is not restricted to the above-described two typical methods of calculating the next update prediction time with the update history storage section 108. For instance, a method may be used which uses a specific number of update times from the latest or all of the recorded update times as arguments and calculates the next update prediction time using a statistical distribution function.

Regarding the data at the start of data acquisition, the pieces of time information recorded in the update history may not be enough for a specific method of calculating the next update prediction time. For example, the method using $T_0+(T_0-T_1)$ needs at least two pieces of information on update time. One method of using a specific number of update times from the latest as arguments and calculating the next update prediction time using a statistical distribution function requires at least information on the specific number of update times. In this case, for example, a next update prediction time may be calculated by adding a predetermined constant to the latest time $T_0$ or by using another statistical distribution function that uses a value smaller than the constant as an argument.

Next, in FIG. 3, the process at the time when no data has been acquired will be explained by reference to FIGS. 6 and 7A to 7C. In the explanation of the operation of the overall information acquisition system of FIG. 3, the operation at the time when no data has been acquired is not shown in FIG. 3 to simplify the explanation. Therefore, the operation at the time when no data has been acquired will be described using the flowchart of FIG. 6 in connection with FIG. 3.

At step S108, when the transmission/reception section 107 has failed to acquire the data specified by the link (NO at step S151), the transmission/reception section 107 notifies the update history storage section 108 of the fact that no data has been acquired (step S152). As explained in FIG. 3, when the data has been acquired (YES at step S151), control proceeds to the process at step S109 of FIG. 3.

Referring to the history table corresponding to the link, the update history storage section 108 determines whether or not a specified time has elapsed (step S153) since the latest update time registered in the history table. If the specified time has elapsed (YES at step S153), the update history storage section 108 will delete all of the information related to the link. Namely, it deletes all of the corresponding history table, next update prediction time, and the entries of the link itself (step S154).

At step S153, when the specific time has not elapsed, the update history storage section will register the time at which the data acquisition process has been started in the data acquisition time item in the history table and data indicating that the data acquisition has failed in the update time item (step S155). Furthermore, the update history storage section 108 calculates the next update prediction time, provided that the data has been acquired, and informs the next update prediction time storage section 105 of the calculation result.

After the process at step S154 or step S155 has been carried out, the process at step 102 of FIG. 3 is executed.

In the above processes, when it takes more than a specific time for data acquisition and the data cannot be acquired, all the entries related to the link are deleted. This makes it possible to make effective use of the limited memory area that stores various types of information related to links. Even if data acquisition has failed once, when a subsequent data acquisition has succeeded within a specified period of time, the history table in which the entries have been registered can be used.

Now, the transition of information in the above process will be described by reference to FIGS. 7A to 7C. It is assumed that links and the information related the links as shown in FIG. 7A are stored in the information acquisition system. In the history table HT1 of link "http://www.a.co.jp/", the fact that the data acquisition process was executed at 12:00, June 29 and at 12:00, June 30, but the data could not be acquired has been registered. The specific period of time is assumed to set at 50 hours.

When the process of acquiring the data specified by link "http://www.a.co.jp/" was at 12:00, July 1, and the data acquisition was successful, the fact that the data was acquired at 12:00, July 1 is registered in the history table as shown in FIG. 7B. Thereafter, by the method explained by reference to FIG. 5A or 5B, the next update prediction time is calculated. At that time, the previous data at the time when the data acquisition failed can be used.

When the data acquisition has failed, 50 hours have elapsed since 12:00, June 28 at which the preceding data acquisition was successful. Therefore, as shown in FIG. 7C, all of the information related to link "http://www.a.co.jp/" deleted.

In this way, the limited memory area that stores various types of information related to links can be used effectively. In addition, even if the data acquisition has failed once, when a subsequent data acquisition has succeeded within the specified period of time, the history table in which the entries have been registered can be used.

As explained above, with the first embodiment, update history information on each data item is accumulated. On the basis of the accumulated pieces of update history information, the update characteristic of each data item is estimated and the data acquisition time is scheduled, thereby realizing the data acquisition at the same frequency as that of update of each data item.

Furthermore, the process of acquiring unupdated data items unnecessarily can be suppressed beforehand. This helps improve the efficiency of data acquisition.

Hereinafter, a second embodiment of the present invention will be explained.

Figure 8:
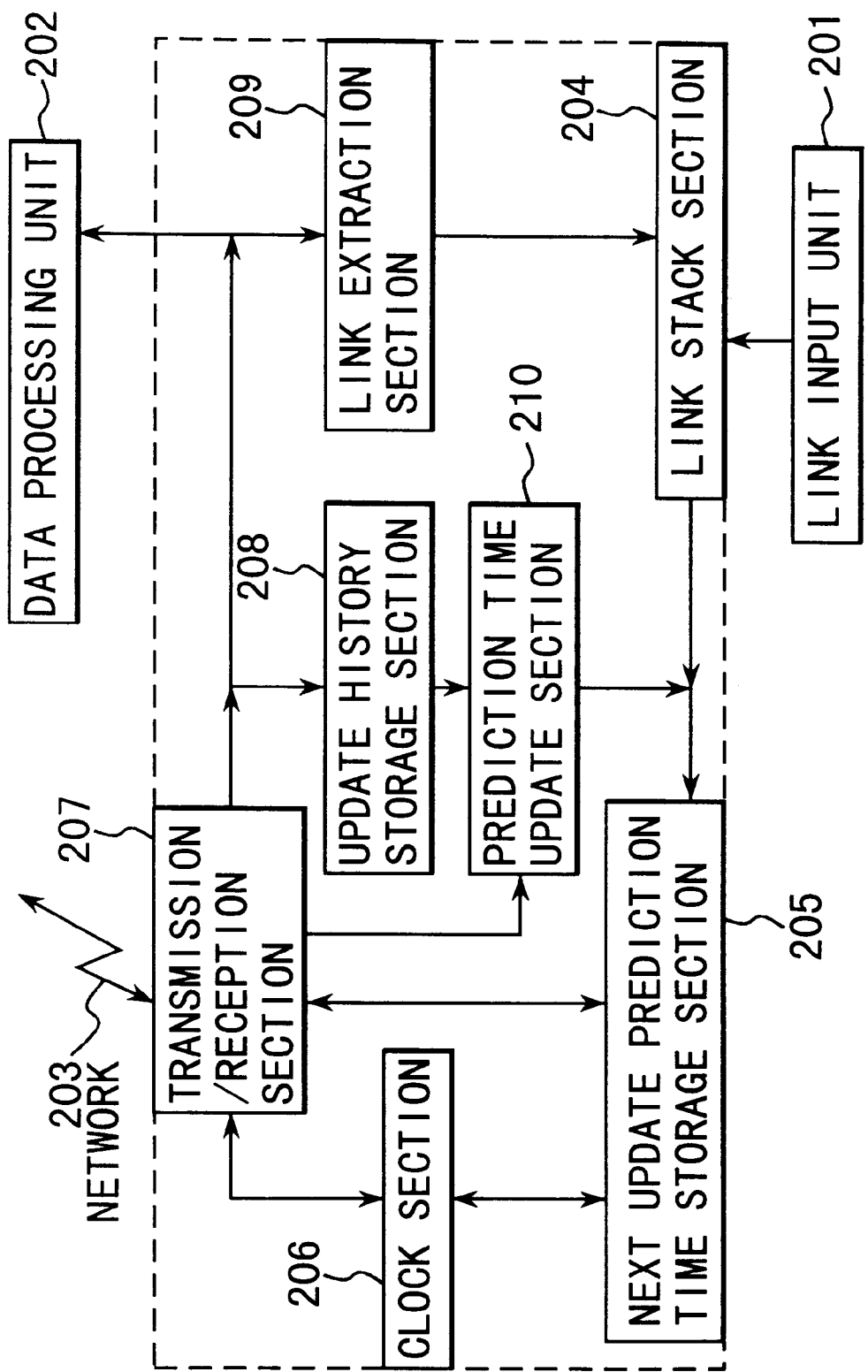
FIG. 8 is a block diagram of an information acquisition system according to a second embodiment of the present invention, being accompanied by peripheral devices.

FIG. 8 is a block diagram of an information acquisition system according to the second embodiment. In FIG. 8, the component parts enclosed by the dotted line constitute the information acquisition system of the second embodiment.

The information acquisition system comprises a link stack section 204, a next update prediction time storage section 205, a clock section 206, a transmission/reception section 207, an update history storage section 208, a prediction time change section 210, and a link extraction section 209.

The link stack section 204, next update prediction time storage section 205, clock section 206, transmission/reception section 207, update history storage section 208, and link extraction section 209 in the second embodiment are the same as the link stack section 104, next update prediction time storage section 105, clock section 106, transmission/reception section 107, update history storage section 108, and link extraction section 109 in the first embodiment, respectively.

Namely, the information acquisition system of the second embodiment is obtained by adding the prediction time change section 210 to the information acquisition system of the first embodiment.

The prediction time change section 210 produces an adjustment next update prediction time on the basis of the time difference needed for transmission and reception and the next update prediction time transmitted from the update history storage section 208.

A link input unit 201, a data processing unit 202, and a network 203 in the second embodiment are the same as the link input unit 101, data processing unit 102, and network 103 in the first embodiment, respectively.

Figure 9:
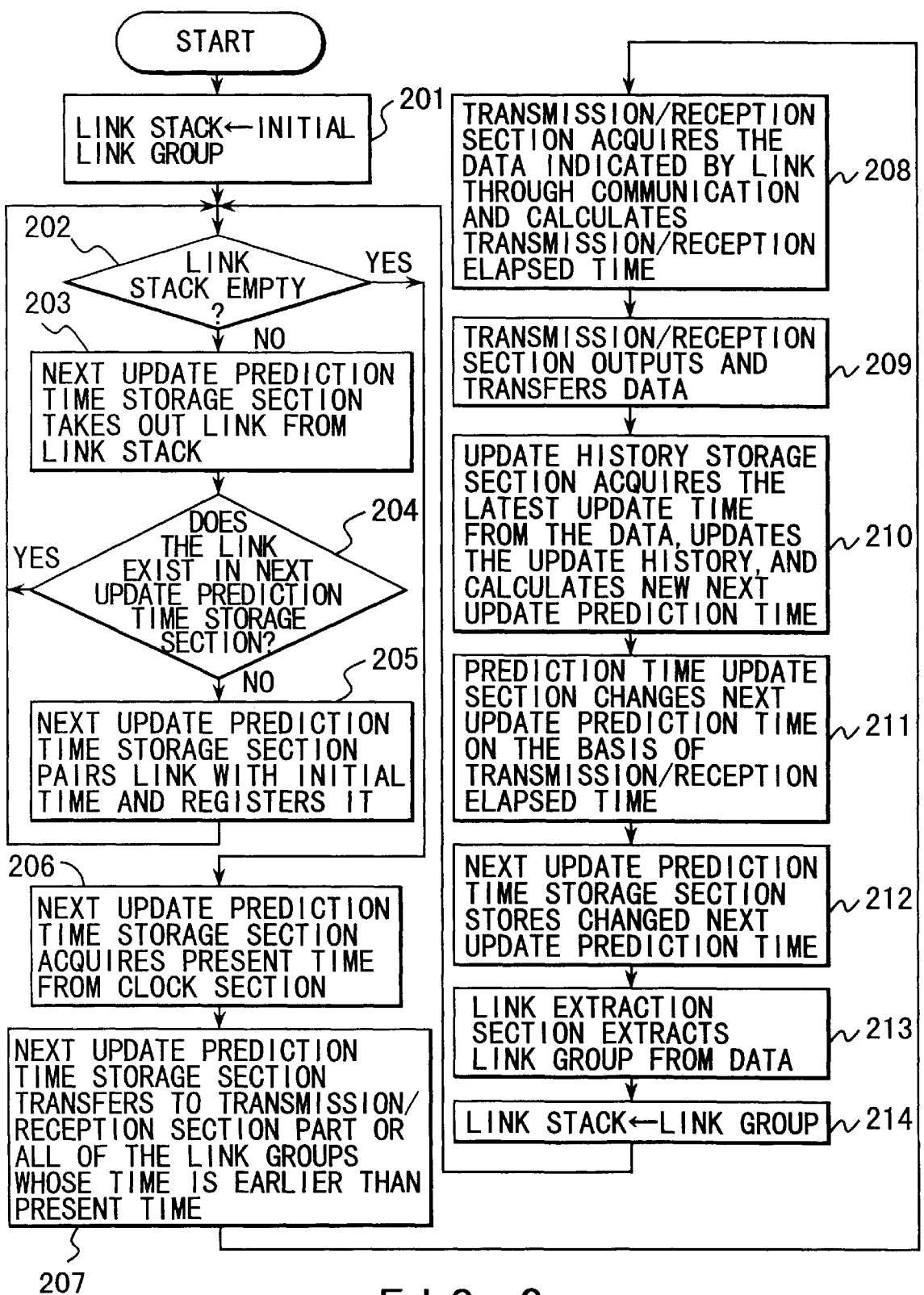
FIG. 9 is a flowchart for the overall operation of the information acquisition system of FIG. 8.

Hereinafter, the operation of the information acquisition system of the second embodiment will be descried by reference to FIG. 9.

First, the link stack section 204 in the information acquisition system receives the initial link group transferred from the link input unit 201 (step S201). The link stack section 204 transfers each link group sent in step S201 or step S214 (explained later) to the next update prediction time storage section 205 (steps S202, S203).

If the link transferred at step S203 has not been registered, the next update prediction time storage section 205 relates the link to the next update prediction time (the initial time) and stores it as shown in FIG. 2, for example (steps S204, S205).

In the second embodiment, as in the first embodiment, it is assumed that the time when the information acquisition system is started up is used as the initial time. The value of the initial time can be compared with the output of the clock section 206. The initial time may take any value as long as it is not later than the time outputted from the clock section 206 at least at that time. For instance, the oldest time may be used as the initial time.

Next, at step S202, when the data link stack gets empty, the next update prediction time storage section 205 gets the present time from the clock section 206 (step S206). Instead of the next update prediction time storage section 205 asking the clock section 206 for the present time, the clock section 206 may automatically transfer information on the present time to the next update prediction time storage section 205.

The next update prediction time storage section 205 transfers to the transmission/reception section 207 part or all of the links whose corresponding next update prediction times are earlier than the time transferred at step S206 (step S207).

The transmission/reception section 207 makes communication through the network 203 and acquires the data specified by the link transferred at step S207 (step S208).

Regarding data acquisition, a default value may be set beforehand and, when it is found before communication or in the course of communication control that data items whose values are larger than the default value are to be acquired, only those from the beginning up to a specific value may be actually acquired.

Moreover, of the data items, those including no link may not be acquired, thereby reducing the actually acquired data size.

The transmission/reception section 207 outputs the data acquired at step S208 to the data processing unit 202 and to the update history storage section 208 and link extraction section 209 (step S209). At that time, the order of output and transfer is not limited.

When information on the latest update time exists in the data transferred at step S209, the update history storage section 208 extracts the latest update time. Next, the update history storage section 208 adds the extracted latest update time to the update history corresponding to the link transferred to the transmission/reception section 207 at step S207 and calculates the next update prediction time from the additionally updated update history (step S210). The details of process at step S211 is the same as in the first embodiment.

The update history storage section 208 transfers the next update prediction time calculated at step S210 to the prediction time change section 210.

When the time needed for transmission and reception at step S209 is larger than a preset time value, the prediction time change section 210 adds a preset time delay value to the next update prediction time transferred at step S210 to update it and transfers the updated next update prediction time to the next update prediction time storage section 205 (step S211).

Instead of delaying the update of the next update prediction time, the next update prediction time may be advanced by adding a preset time-lead value (negative value) to the next update prediction time.

Whether the prediction time change section 210 is caused to make a change to advance or delay the next update prediction time may be predetermined or be determined according to the situation at that time, such as being determined according to the value of the next update prediction time.

Furthermore, the amount of change added to the next update prediction time may be predetermined or be determined according to the situation at that time, such as being determined according to the length of time needed for transmission and reception.

The next update prediction time storage section 205 replaces the update prediction time corresponding to the link transferred to the transmission/reception section 207 at step S207 with the next update prediction time transferred at step S211 (step S212).

The link extraction section 209 extracts the link group from the data transferred at step S209 (step S213) and transfers it to the link stack section 204. The link stack section 204 stores the transferred link group (step S214).

The processes at steps S213 and S214 may be carried out independently of the processes at steps S210 and S211.

Thereafter, control returns to step S202. As described earlier, the link stack section 204 sends each of the link groups extracted at step S213 to the next update prediction time storage section 205, only when the link has not been registered in the next update prediction time storage section 205. In response to this, the next update prediction time storage section 205 pairs each received link with the initial time and registers the pair (steps S202 to S205).

From this time on, in the information acquisition system, the aforementioned processes are performed repeatedly.

In the second embodiment, the transmission/ reception 210 sends the time needed for communication to the prediction time change section 210. Instead, the transmission/ reception section 207 may have the function of monitoring a communication load regarding data acquisition and transfer the communication load value to the prediction time change section 210. Then, the prediction time change section 210 may change the next update prediction time when the communication load value is equal to or larger than a specific value.

As described above, with the second embodiment, update history information on each data item is accumulated. On the basis of the accumulated pieces of update history information, the update characteristic of each data item is estimated and the reference time is scheduled, thereby realizing the data reference at the same frequency as that of update of each data item.

Furthermore, the process of acquiring unupdated data items unnecessarily can be suppressed beforehand. This helps improve the efficiency of data acquisition.

Moreover, the communication characteristic is grasped by accumulating the communication conditions at the time of each data acquisition. By scheduling the reference time, taking into account the communication characteristic, reference can be made at the time best suited for reference to each data item and the server that holds the data items. This helps improve the efficiency of data acquisition.

Hereinafter, a third embodiment of the present invention will be explained.

Figure 10:
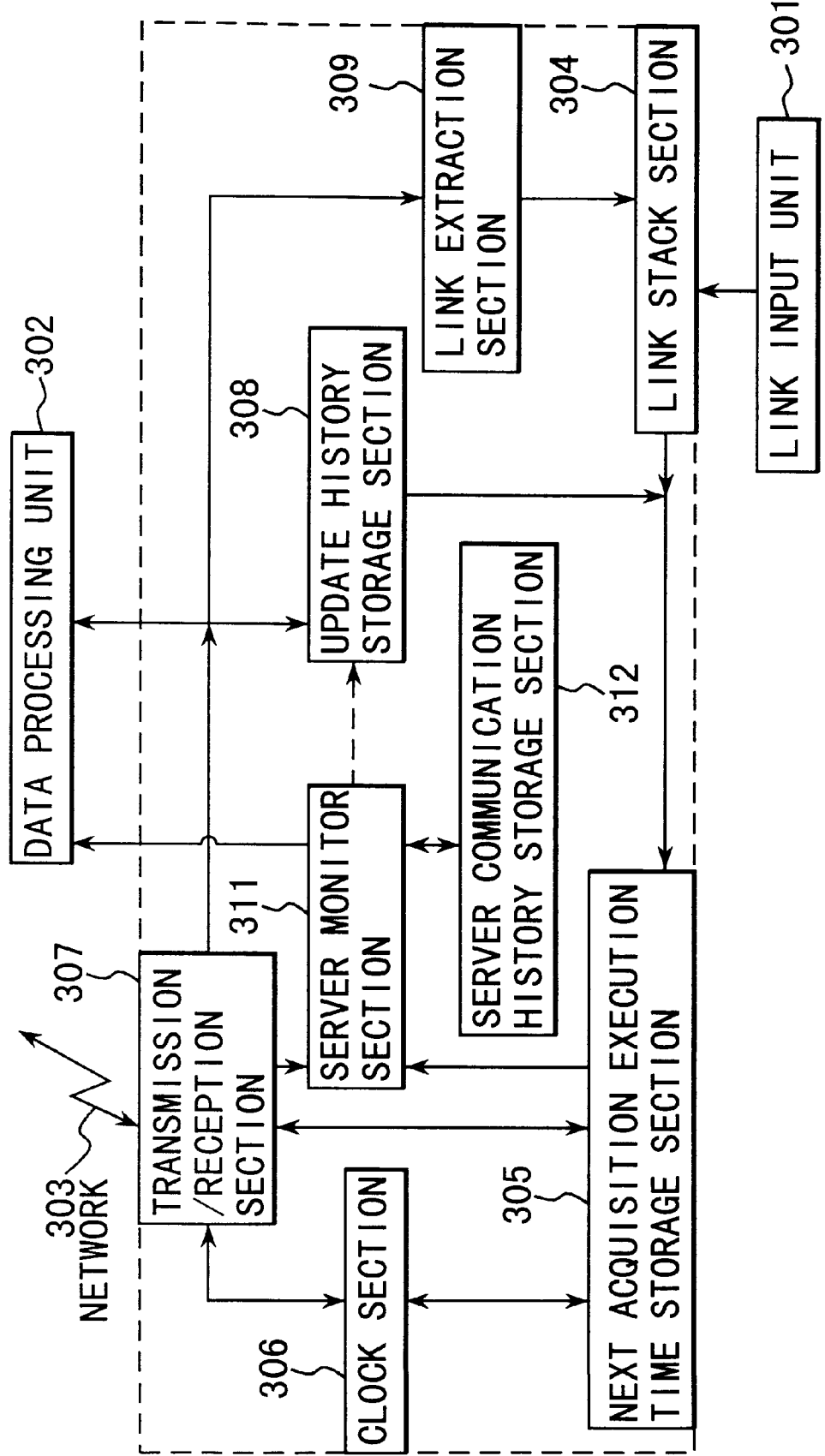
FIG. 10 is a block diagram of an information acquisition system according to a third embodiment of the present invention, being accompanied by peripheral devices.

FIG. 10 is a block diagram of an information acquisition system according to the third embodiment. In FIG. 10, the component parts enclosed by the dotted line constitute the information acquisition system of the third embodiment.

The information acquisition system comprises a link stack section 304, a next acquisition execution time storage section 305, a clock section 306, a transmission/reception section 307, a server monitor section 311, a server communication history storage section 312, an update history storage section 308, and a link extraction section 309.

The link stack section 304, next acquisition execution time storage section 305, clock section 306, transmission/ reception section 307, update history storage section 308, and link extraction section 309 in the third embodiment correspond to the link stack section 104, next update prediction time storage section 105, clock section 106, transmission/reception section 107, update history storage section 108, and link extraction section 109 in the first embodiment, respectively. Although in the third embodiment, the next update prediction time storage section 105 of the first embodiment is replaced with the next acquisition execution time storage section 305, they function in the same manner. The reason why the name is changed is that the time notified to the next acquisition execution time storage section 305 means not the predicted next update time, but the time at which the acquisition process is to be executed next time.

Namely, the information acquisition system of the third embodiment is obtained by adding the server monitor section 311 and the server communication history storage section 312 to the information acquisition system of the first embodiment.

The server monitor section 311 exchanges data with the server communication history storage section 312.

The server communication history storage section 312 holds a history of the transmission/reception time and communication speed between the individual servers and the information acquisition system.

The arrow shown by a dotted line extending from the server monitor 311 to the update history storage section 308 corresponds to a case where the result calculated at the server monitor section 311 is used in the information acquisition system (in this case, in the update history storage section 308).

A link input unit 301, a data processing unit 302, and a network 303 in the third embodiment are the same as the link input unit 101, data processing unit 102, and network 103 in the first embodiment, respectively.

Figure 11:
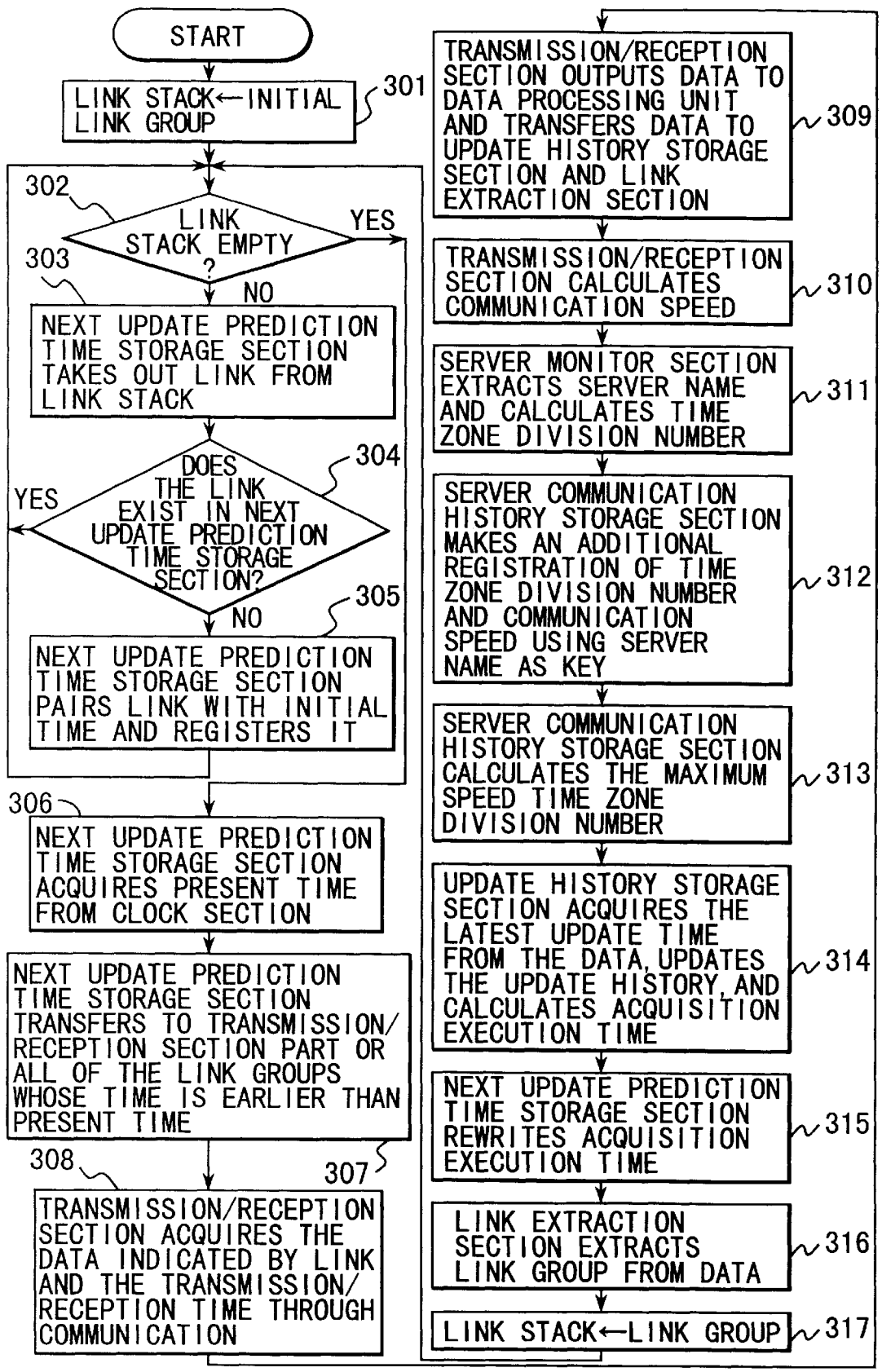
FIG. 11 is a flowchart for the overall operation of the information acquisition system of FIG. 10.

Hereinafter, the operation of the information acquisition system of the third embodiment will be descried by reference to the flowchart of FIG. 11.

First, the link stack section 304 in the information acquisition system receives the initial link group transferred from the link input unit 301 (step S301). The link stack section 304 transfers each link group sent in step S301 or step S314 (explained later) to the next acquisition execution time storage section 305 (steps S302, S303).

If the link transferred at step S303 has not been registered, the next acquisition execution time storage section 305 relates the link to the acquisition execution time (the initial time) and stores it as shown in FIG. 2 (steps S304, S305). The acquisition execution time is the time used in the same manner as the next update prediction time in the ..first and second embodiments. As described earlier, in the third embodiment, the name is changed because the time notified to the next acquisition execution time storage section 305 means not the predicted next update time, but the time at which the acquisition process is to be executed next time.

As in the first embodiment, in the third embodiment, it is assumed that the time when the information acquisition system is started up is used as the initial time. The value of the initial time can be compared with the output of the clock section 306. The initial time may take any value as long as it is not later than the time outputted from the clock section 306 at least at that time. For instance, the oldest time may be used as the initial time.

Next, at step S302, when the data link stack gets empty, the next acquisition execution time storage section 305 gets the present time from the clock section 306 (step S306). Instead of the next acquisition execution time storage section 305 asking the clock section 306 for the present time, the clock section 306 may automatically transfer information on the present time to the next acquisition execution time storage section 305.

The next update prediction time storage section 305 transfers to the transmission/reception section 307 part or all of the links whose corresponding next acquisition execution times are earlier than the time transferred at step S306 (step S307).

The transmission/reception section 307 makes communication through the network 303 and acquires the data specified by the link transferred at step S307 (step S308). At that time, the time needed for transmission and reception is calculated through communication with the clock section 306.

Regarding data acquisition, as in the first embodiment, a default value may be set beforehand and, when it is found before communication or in the course of communication control that data items whose values are larger than the default value are to be acquired, only those from the beginning up to a specific value may be actually acquired. Moreover, of the data items, those including no link may not be acquired, thereby reducing the actually acquired data size.

The transmission/reception section 307 outputs the data acquired at step S308 to the data processing unit 302 and to the update history storage section 308 and link extraction section 309 (step S309). At that time, the order of output and transfer is not limited.

Furthermore, the transmission/reception 307 calculates the transmission speed from the time needed for transmission and reception calculated at step S308 and the size of the acquired data and transfers the transmission speed together with the transmission time to the server monitor section 311 (step S310).

Step S310 and step S309 may be replaced with each other or be executed in parallel.

The server monitor section 311 extracts a server name on the network from the link transferred at step S307 (step S311).

Step S311 may be executed with any timing on the condition that it is after step S307 and before S312, such as immediately after step S307.

The server monitor section 311 calculates which of the preset time zone divisions the transmission time transferred at step S310 belongs to and sends the time zone division number, the communication speed transferred at step S310, and the server extracted at step S311 to the server communication history storage section 312.

The server communication history storage section 312 combines the transferred server name, time zone division number, and communication speed into a set and registers the set additionally (step S312).

Then, the server communication history storage section 312 selects the fastest of the communication speeds combined with the transferred server names and sends the fastest speed and the time zone division number combined with this speed to the server monitor section 311 (step S311). Another example is to calculate the average communication speed for each time zone division number for the sets having the same server name and then transfer the time zone division number for which the average communication speed is the highest, or further substitute sets of average communication speeds for each time division number into a statistical distribution function, such as a normal distribution, to calculate a time zone division number indicating the highest speed in the distribution function and transfer it.

The server monitor section 311 transfers the server name and the transferred time zone division number to the data processing unit 302 (step S313). In place of the process or in addition to the process, the server monitor section 311 may transfer the server name and the transferred time zone division number to the update history storage section 308 as an argument for the update history storage section 308 to calculate the next acquisition execution time.

When information on the latest update time exists in the data transferred at step S309, the update history storage section 308 extracts the latest update time (step S314). The process related to the extraction of the update time is the same as in the first embodiment.

Regarding a link indicating no practical data, as described in the first embodiment, there is a method of leaving it as an object of reference without deleting it from the update history storage section 308 and the next update prediction time storage section 305. There are still other methods of deleting links that have indicated no practical data for more than a specified period of time and of deleting links indicating no practical data immediately.

Next, the update history storage section 308 adds the extracted latest update time to the update history corresponding to the link transferred to the transmission/reception section 307 at step S307 (step S314).

Furthermore, the update history storage section 308 calculates the next update prediction time from the additionally updated update history added and updated (step S314). The process as explained in the first embodiment can be applied to the calculation of the next update prediction time. It is desirable, however, that when at step S313, the server monitor section 311 transfers the server name and the time zone division number to the update history storage section 308, the next update prediction time for the data in the relevant server should be determined to be the time on the time zone division number immediately after the thus obtained next update prediction time, for example. The time obtained by such a process is the acquisition execution time. The details of the process will be explained later.

The update history storage section 308 transfers the next acquisition execution time calculated at step S314 to the next acquisition execution time storage section 305.

The next acquisition execution time storage section 305 replaces the next acquisition execution time corresponding to the link transferred to the transmission/reception section 307 at step S307 with the transferred next acquisition execution time (step S315).

The link extraction section 309 extracts the link group from the data transferred at step S309 (step S316) and transfers it to the link stack section 304.

The link stack section 304 stores the transferred link group (step S317).

The processes at steps S316 and s317 may be carried out independently of the processes at steps S310 and S315.

Thereafter, control returns to step S302. As described earlier, the link stack section 304 pairs each of the link groups extracted at step S316 with the initial time only when the link has not been registered in the next acquisition execution time storage section 305, and registers them in the next acquisition execution time storage section 305 (steps S302 to S305).

From this time on, the aforementioned processes are performed repeatedly.

Figure 12:
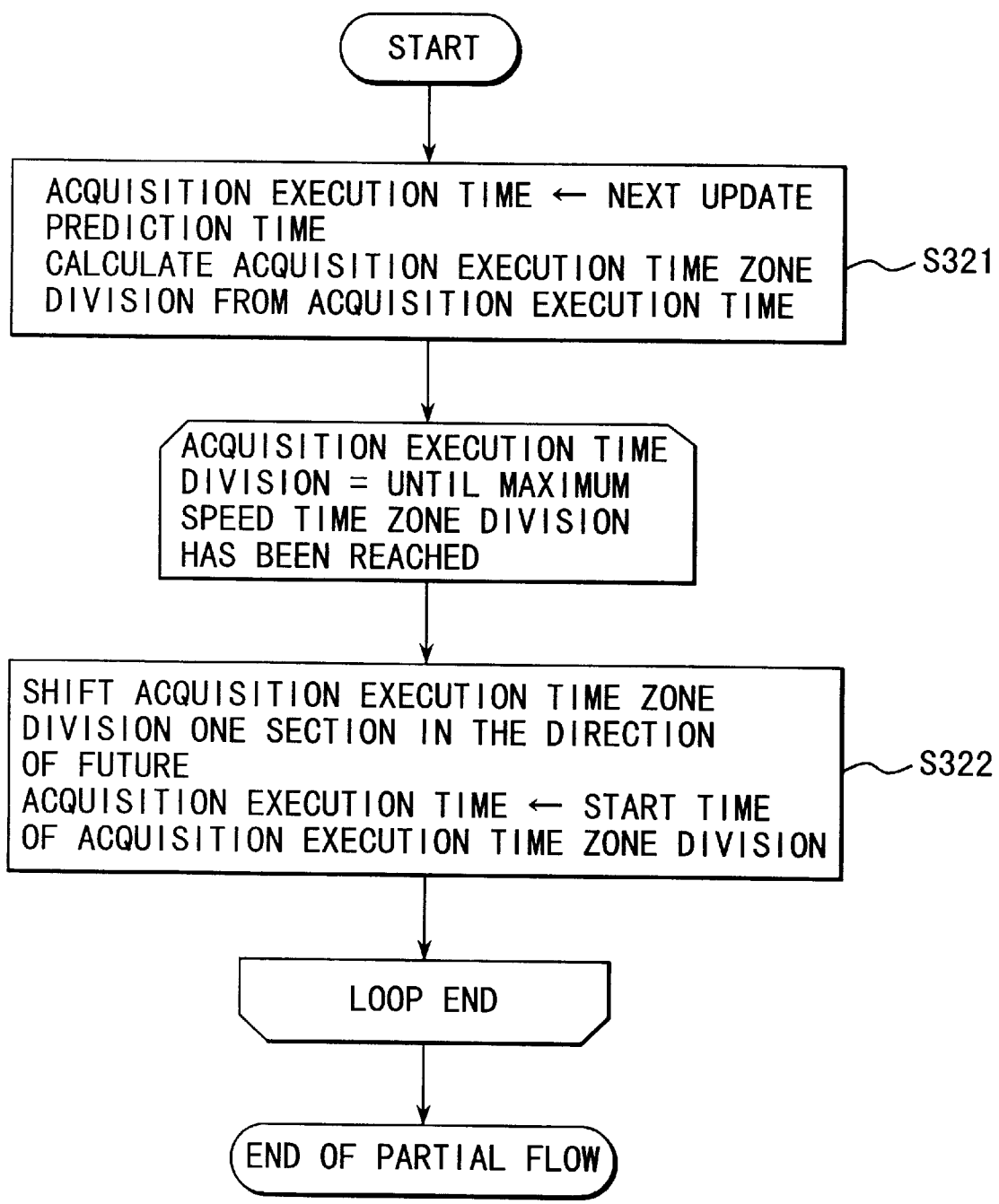
FIG. 12 is a flowchart for the process of calculating the acquisition execution time shown in FIG. 11.

Next explained will be the process of determining the next acquisition execution time for the data in the relevant server to be the time on the time zone division number immediately after the next acquisition execution time obtained at step S311 in the process of calculating the next acquisition execution time at step S314. The explanation will be given by reference to the flowchart of FIG. 12.

It is assumed that the next update prediction time and the highest speed time zone division have been calculated already. Because the time calculated in the process explained here is not the time at which the data is to be updated, but the time at which the data acquisition process is to be executed, the term "acquisition execution time" is used to distinguish it from the term "next update prediction time."

First, the update history storage section 308 sets the next update prediction time obtained in the preceding process for the acquisition execution time and finds the time zone division (the acquisition execution time zone division) corresponding to the acquisition execution time (step S321). Thereafter, the process is repeated in which the acquisition execution time zone division is updated so as to be shifted one division in the direction of future until the acquisition execution time zone division is equal to the highest speed time zone division obtained in the preceding process and in which the acquisition execution time is set at the start time of the updated acquisition execution time division (step S322).

When the acquisition execution time zone division becomes equal to the highest speed time zone division, the process is completed. The acquisition execution time at that time is notified to the next update prediction time storage section 305. The next update prediction time storage section 305 registers the acquisition execution time as the next update prediction time. As described earlier, the time registered here means not the time at which the data is to be updated, but the time at which data acquisition is to be executed.

In the above process, instead of the process of comparing the acquisition execution time division with the highest speed time zone division, which of the independently calculated practical high-speed time zone divisions the acquisition execution time division falls on may be determined.

As described above, with the third embodiment, update history information on each data item is accumulated. On the basis of the accumulated pieces of update history information, the update characteristic of each data item is estimated and the data acquisition time or time zone is scheduled, thereby realizing the data acquisition at the same frequency as that of update of each data item.

Furthermore, the process of referring to unupdated data items unnecessarily can be suppressed beforehand. This helps improve the efficiency of data acquisition.

Moreover, the communication characteristic is grasped by accumulating the communication conditions in connection with the server at the time of each data acquisition. By scheduling the reference time or time zone, taking into account the communication characteristic, the data acquisition process can be performed at the time or time zone best suited for acquiring each data item and for accessing the server that holds the data items. This helps improve the efficiency of data acquisition.

Hereinafter, a fourth embodiment of the present invention will be explained.

Figure 13:
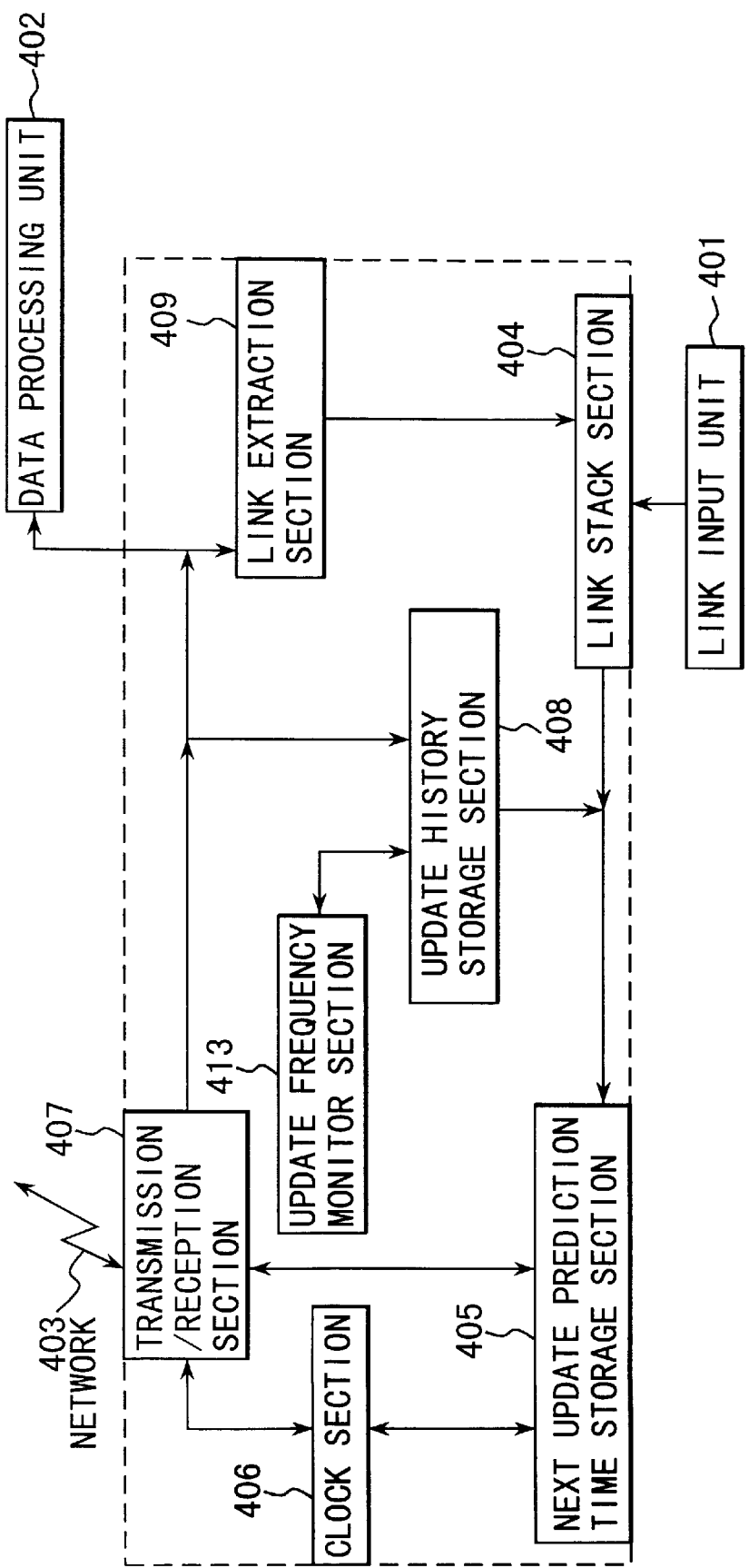
FIG. 13 is a block diagram of an information acquisition system according to a fourth embodiment of the present invention, being accompanied by peripheral devices.

FIG. 13 is a block diagram of an information acquisition system according to the fourth embodiment. In FIG. 13, the component parts enclosed by the dotted line constitute the information acquisition system of the fourth embodiment.

The information acquisition system of FIG. 13 comprises a link stack section 404, a next update prediction time storage section 405, a clock section 406, a transmission/reception section 407, an update frequency monitor section 413, an update history storage section 408, and a link extraction section 409.

The link stack section 404, next update prediction time storage section 405, clock section 406, transmission/reception section 407, update history storage section 408, and link extraction section 409 in the fourth embodiment are the same as the link stack section 104, next update prediction time storage section 105, clock section 106, transmission/reception section 107, update history storage section 108, and link extraction section 109 in the first embodiment, respectively.

Namely, the information acquisition system of the fourth embodiment is obtained by adding the update frequency monitor section 413 to the information acquisition system of the first embodiment.

A link input unit 401, a data processing unit 402, and a network 403 in the fourth embodiment are the same as the link input unit 101, data processing unit 102, and network 103 in the first embodiment, respectively.

Figure 14:
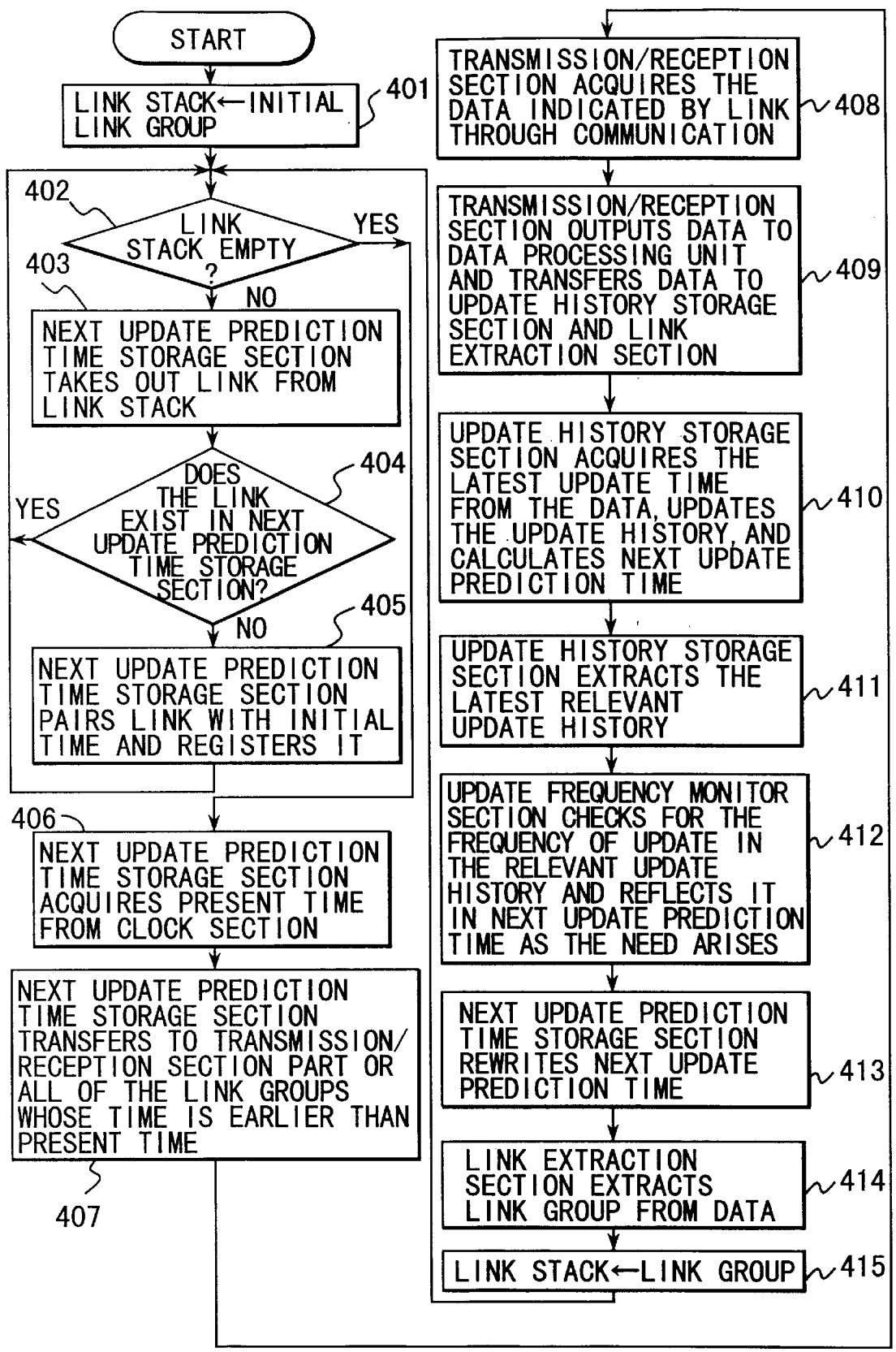
FIG. 14 is a flowchart for the overall operation of the information acquisition system of FIG. 13.

Hereinafter, the operation of the information acquisition system of the fourth embodiment will be descried by reference to the flowchart of FIG. 14.

First, the link stack section 404 in the information acquisition system receives the initial link group transferred from the link input unit 401 (step S401). The link stack section 404 transfers each link group sent in step S401 or step S415 (explained later) to the next update prediction time storage section 405 (steps S402, S403).

If the link transferred at step S403 has not been registered, the next update prediction time storage section 405 relates the link to the next update prediction time (the initial time) and stores it as shown in FIG. 2 (steps S404, S405).

In the fourth embodiment, as in the first embodiment, it is assumed that the time when the information acquisition system is started up is used as the initial time. The value of the initial time can be compared with the output of the clock section 406. The initial time may take any value as long as it is not later than the time outputted from the clock section 406 at least at that time. For instance, the oldest time may be used as the initial time.

Next, at step S402, when the data link stack gets empty, the next update prediction time storage section 405 gets the present time from the clock section 406 (step S406). Instead of the next update prediction time storage section 405 asking the clock section 406 for the present time, the clock section 406 may automatically transfer information on the present time to the next update prediction time storage section 405.

The next update prediction time storage section 405 transfers to the transmission/reception section 407 part or all of the links whose corresponding next update prediction times are earlier than the time transferred at step S406 (step S407).

The transmission/reception section 407 makes communication through the network 403 and acquires the data specified by the link transferred at step S407 (step S408).

Regarding data acquisition, as described in the first embodiment, a default value may be set beforehand and, when it is found before communication or in the course of communication control that data items whose values are larger than the default value are to be acquired, only those from the beginning up to a specific value may be actually acquired. Moreover, of the data items, those including no link may not be acquired, thereby reducing the actually acquired data size.

The transmission/reception section 407 outputs the data acquired at step S408 to the data processing unit 402 and to the update history storage section 408 and link extraction section 409 (step S409). At that time, the order of output and transfer is not limited.

When information on the latest update time exists in the data transferred at step S409, the update history storage section 408 extracts the latest update time (step S410). The judgment and extraction of the update is the same as in the first embodiment, so a detailed explanation will not be given.

Next, the update history storage section 408 adds the extracted latest update time to the update history corresponding to the link transferred to the transmission/reception section 407 at step S407 (step S410).

Furthermore, the update history storage section 408 transfers to the update frequency monitor section 413 the part of the additionally updated update history in the preset time zone earlier than the present time indicated by the clock section 406 (step S411). Another example is to use the time at step S405, instead of the present time indicated by the clock section 406.

The update frequency monitor section 413 calculates the interval between updates from the partial update history transferred at step S411 and finds the number of times that the interval is smaller than a preset value (step S412). As another example, the update frequency monitor section 413 calculates the number of times that the interval between updates is smaller than the preset value and holds the result at step S407, the update history storage section 408 transfers only the latest update time at step S410 and the update time immediately before that time to the update frequency monitor section 413 at step S411, and only the latest update interval is determined to be an object of check to be added newly at step S412.

The update frequency monitor section 413 sends to the update history storage section 408 information on whether or not the number of times calculated at step S413 is larger than a preset value (step S412). Here, when the number of times calculated at step S413 is larger than the preset value, the contents of the information are determined to be true. When it is not larger than the preset value, the contents of the information are determined to be false.

The update history storage section 408 calculates a temporary value of the next update prediction time from the update history additionally updated at step S410 (step S412).

The approach in the first embodiment can be applied to the temporary value of the next update prediction time.

The update history storage section 408 adds a preset value to the temporary value of the next update prediction time calculated at step S412 to produce the next update prediction time, when the value transferred from the update frequency monitor section 413 is true (when the number of times is larger than the preset value). The update history storage section determines the temporary value of the next update prediction time to be the next update prediction time, when the transferred value is false (step S412). The update history storage section may use a value indicating a temporary stop of reference as the next update prediction time when the transferred value is true, although it determines the temporary value of the next update prediction time to be the next update prediction time when the transferred value is false. Moreover, the update frequency monitor section 413 may delete the registration related to the link transferred to the transmission/reception section 407 at step S407 from the update history storage section 408 and the next update prediction time storage section 405, as the need arises.

The update history storage section 408 transfers the next update prediction time calculated at step S412 to the next update prediction time storage section 405.

The next update prediction time storage section 405 replaces the next update prediction time corresponding to the link transferred to the transmission/reception section 407 at step S407 with the next update prediction time transferred at step S417 (step S413).

The link extraction section 409 extracts the link group from the data transferred at step S408 (step S414) and transfers it to the link stack section 404.

The link stack section 404 stores the transferred link group (step S416).

The processes at steps S414 and S415 may be carried out independently of the processes at steps S410 and S413.

Thereafter, control returns to step S402. As described earlier, the link stack section 404 pairs each of the link groups extracted at step S412 with the initial time and registers them in the next update prediction time storage section 405, only when the link group has not been registered in the next update prediction time storage section 405 (steps S402 to S405).

From this time on, the aforementioned processes are performed repeatedly.

As described above, with the fourth embodiment, update history information on each data item is accumulated. On the basis of the accumulated pieces of update history information, the update characteristic of each data item is estimated and the data acquisition time or time zone is scheduled, thereby realizing the data acquisition at the same frequency as that of update of each data item.

Furthermore, the process of acquiring unupdated data items unnecessarily can be suppressed beforehand. This helps improve the efficiency of data acquisition.

Moreover, with the fourth embodiment, the data items frequently updated are monitored and suitable measures are taken to deal with such data items. The measures include delaying the time at which the data is acquired, temporarily stopping reference to the data, and making it impossible to refer to the data by deleting the registration of the information about the link to the data. This helps improve the efficiency of data acquisition.

Hereinafter, a fifth embodiment of the present invention will be explained.

Figure 15:
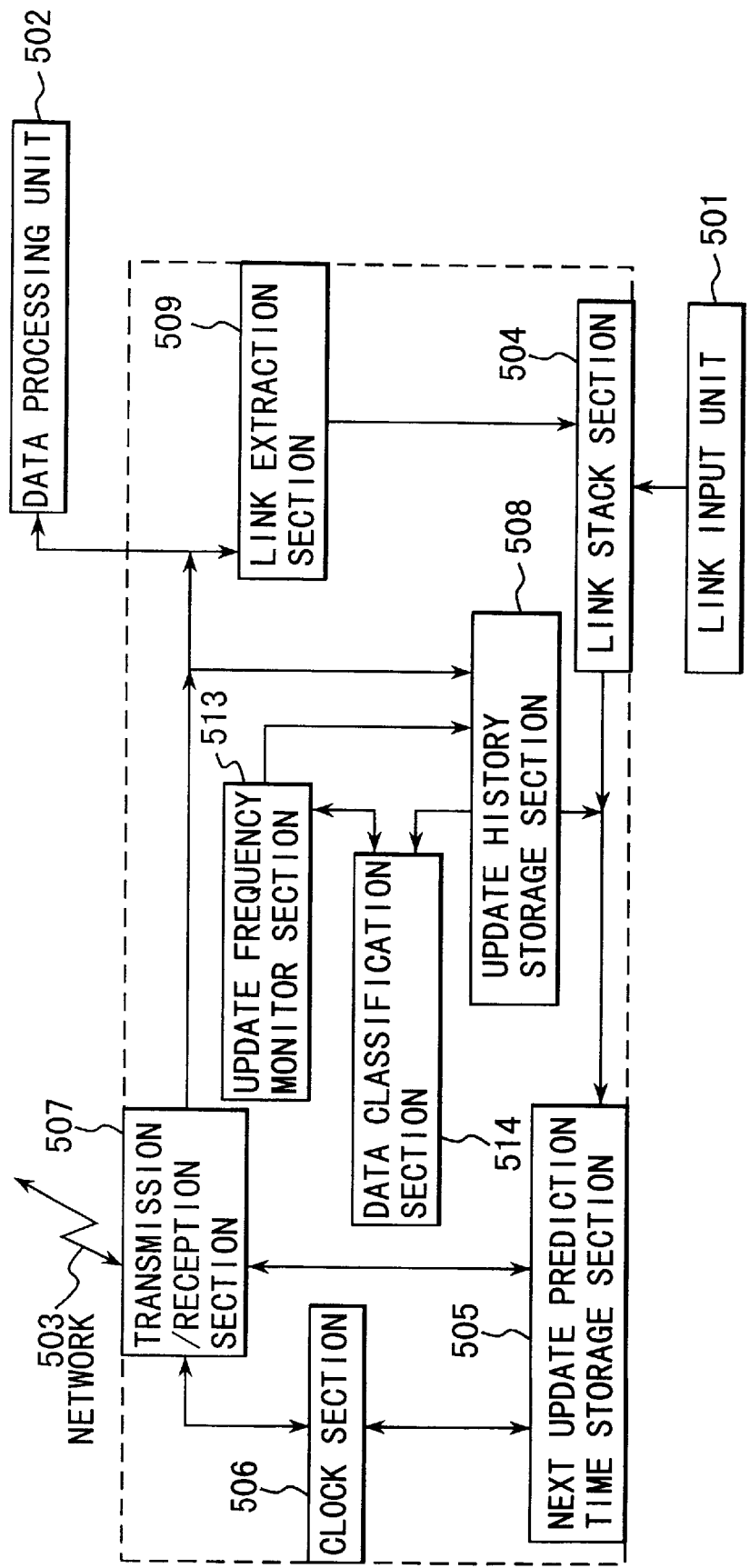
FIG. 15 is a block diagram of an information acquisition system according to a fifth embodiment of the present invention, being accompanied by peripheral devices.

FIG. 15 is a block diagram of an information acquisition system according to the fifth embodiment. In FIG. 15, the component parts enclosed by the dotted line constitute the information acquisition system of the fifth embodiment.

The information acquisition system of FIG. 15 comprises a link stack section 504, a next update prediction time storage section 505, a clock section 506, a transmission/reception section 507, an update frequency monitor section 513, a data classification section 514, an update history storage section 508, and a link extraction section 509.

The link stack section 504, next update prediction time storage section 505, clock section 506, transmission/reception section 507, update history storage section 508, and link extraction section 509 in the fifth embodiment are the same as the link stack section 104, next update prediction time storage section 105, clock section 106, transmission/reception section 107, update history storage section 108, and link extraction section 109 in the first embodiment, respectively.

Namely, the information acquisition system of the fifth embodiment is obtained by adding the update frequency monitor section 513 and the data classification section 514 to the information acquisition system of the first embodiment.

The update frequency monitor section 513 has the function of monitoring the interval between data updates. The data classification section 514 creates a new next update prediction time and a by-class update history from a history table. The data classification section 514 has the function of cutting off a specific length of data from the start of the data and holding several types of such data and of comparing the data with the held data portion when the data is switched between several types for the same link, classifying the data items within the upper limit previously set for each data item, and calculating the interval between updates by class.

A link input unit 501, a data processing unit 502, and a network 503 in the fifth embodiment are the same as the link input unit 101, data processing unit 102, and network 103 in the first embodiment, respectively.

Figure 16:
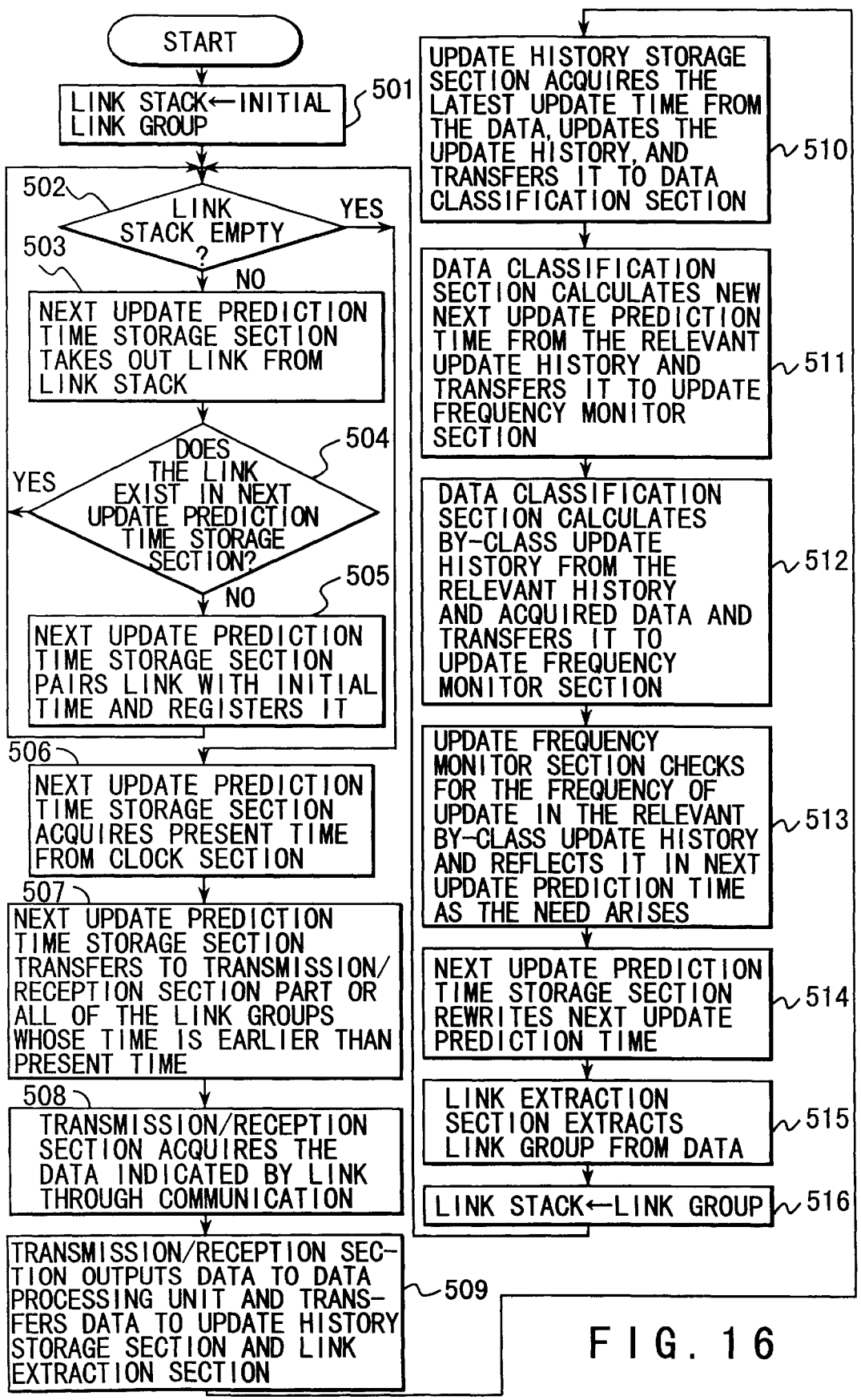
FIG. 16 is a flowchart for the overall operation of the information acquisition system of FIG. 15.

Hereinafter, the operation of the information acquisition system of the fifth embodiment will be descried by reference to the flowchart of FIG. 16.

First, the link stack section 504 in the information acquisition system receives the initial link group transferred from the link input unit 501 (step S501). The link stack section 504 transfers each link group sent in step S501 or step S515 (explained later) to the next update prediction time storage section 505 (steps S502, S503).

If the link transferred at step S503 has not been registered, the next update prediction time storage section 505 relates the link to the next update prediction time (the initial time) and stores it as shown in FIG. 2 (steps S504, S505).

In the fifth embodiment, as in the first embodiment, it is assumed that the time when the information acquisition system is started up is used as the initial time. The value of the initial time can be compared with the output of the clock section 506. The initial time may take any value as long as it is not later than the time outputted from the clock section 506 at least at that time. For instance, the oldest time may be used as the initial time.

Next, at step S502, when the data link stack gets empty, the next update prediction time storage section 505 gets the present time from the clock section 506 (step S506). Instead of the next update prediction time storage section 505 asking the clock section 506 for the present time, the clock section 506 may automatically transfer information on the present time to the next update prediction time storage section 505.

The next update prediction time storage section 505 transfers to the transmission/reception section 507 part or all of the links whose corresponding next update prediction times are earlier than the time transferred at step S506 (step S507).

The transmission/reception section 507 makes communication through the network 503 and acquires the data specified by the link transferred at step S507 (step S508).

Regarding data acquisition, as described in the first embodiment, a default value may be set beforehand and, when it is found before communication or in the course of communication control that data items whose values are larger than the default value are to be acquired, only those from the beginning up to a specific value may be actually acquired. Moreover, of the data items, those including no link may not be acquired, thereby reducing the actually acquired data size.

The transmission/reception section 507 outputs the data acquired at step S508 to the data processing unit 502 and to the update history storage section 508 and link extraction section 509 (step S509). At that time, the order of output and transfer is not limited.

When information on the latest update time exists in the data transferred at step S509, the update history storage section 508 extracts the latest update time (step S510). The judgment and extraction of the update is the same as in the first embodiment, so an detailed explanation will not be given.

Next, the update history storage section 508 adds the extracted latest update time to the update history (history table) corresponding to the link transferred to the transmission/reception section 507 at step S507 (step S510).

The updated update table is sent to the data classification section 514. As described earlier, the data classification section 514 has the function of cutting off a specific length of data from the start of the data and holding several types of such data and of comparing the data with the held data portion when the data is switched between several types for the same link, classifying the data items within the upper limit previously set for each data item, and calculating the interval between updates by class.

The data classification section 514 calculates the next update prediction time from the received history table, creates a by-class history table, and sends it to the update frequency monitor section 513 (steps S511, S512). The calculated next update prediction time is the part of the additionally updated update history lying in the preset time zone earlier than the present time indicated by the clock section 506. Another example is to use the time at step S505, not the present time indicated by the clock section 506.

The update frequency monitor section 513 calculates the interval between updates from the partial update history transferred at step S511 and finds the number of times that the interval is smaller than a preset value (step S513). As another example, the update frequency monitor section 513 calculates the number of times that the interval between updates is smaller than the preset value and holds the result at step S507, the update history storage section 508 transfers only the latest update time at step S510 and the update time immediately before that time to the update frequency monitor section 513 at step S511, and only the latest update interval is determined to be an object of check to be added newly at step S513.

The update frequency monitor section 513 sends to the update history storage section 508 information on whether or not the number of times calculated at step S513 is larger than the preset value (step S513). Here, when the number of times calculated at step S513 is larger than the preset value, the contents of the information are determined to be true. When it is not larger than the preset value, the contents of the information are determined to be false.

The update history storage section 508 calculates a temporary value of the next update prediction time from the update history additionally updated at step S510 (step S513).

The approach in the first embodiment can be applied to the temporary value of the next update prediction time.

The update history storage section 508 adds a preset value to the temporary value of the next update prediction time calculated at step S512, when the value transferred from the update frequency monitor section 513 is true (when the number of times is larger than the preset value). The update history storage section determines the temporary value of the next update prediction time to be the next update prediction time, when the transferred value is false (step S513). The update history storage section may use a value indicating a temporary stop of reference as the next update prediction time when the transferred value is true, although it determines the temporary value of the next update prediction time to be the next update prediction time when the transferred value is false. Moreover, the update frequency monitor section 513 may delete the registration related to the link transferred to the transmission/reception section 507 at step S507 from the update history storage section 508 and the next update prediction time storage section 505, as the need arises.

The update history storage section 508 transfers the next update prediction time calculated at step S512 to the next update prediction time storage section 505.

The next update prediction time storage section 505 replaces the next update prediction time corresponding to the link transferred to the transmission/reception section 507 at step S507 with the next update prediction time transferred at step S513 (step S514).

The link extraction section 509 extracts the link group from the data transferred at step S508 (step S515) and transfers it to the link stack section 504.

The link stack section 504 stores the transferred link group (step S516).

The processes at steps S515 and S516 may be carried out independently of the processes at steps S510 and S514.

Thereafter, control returns to step S502. As described earlier, the link stack section 504 pairs each of the link groups extracted at step S512 with the initial time and registers them in the next update prediction time storage section 505, only when the link group has not been registered in the next update prediction time storage section 505 (steps S502 to S505).

From this time on, the aforementioned processes are performed repeatedly.

As described above, with the fifth embodiment, update history information on each data item is accumulated. On the basis of the accumulated pieces of update history information, the update characteristic of each data item is estimated and the data acquisition time or time zone is scheduled, thereby realizing the data acquisition at the same frequency as that of update of each data item.

Furthermore, the process of acquiring unupdated data items unnecessarily can be suppressed beforehand. This helps improve the efficiency of data acquisition.

Moreover, with the fifth embodiment, the data items frequently updated are monitored and suitable measures are taken to deal with such data items. The measures include delaying the time at which the data is acquired, temporarily stopping reference to the data, and making it impossible to refer to the data by deleting the registration of the information about the link to the data. This helps improve the efficiency of data acquisition.

Hereinafter, a sixth embodiment of the present invention will be explained.

FIG. 17 is a block diagram of an information acquisition system according to the sixth embodiment. In FIG. 17, the component parts enclosed by the dotted line constitute the information acquisition system of the sixth embodiment.

In FIG. 17, a link input unit 601 exists independently of a network robot and has the function of inputting the initial link group that triggers the operation of the network robot.

A data processing unit 602 exists independently of the network robot and provides communication with servers with which the network robot communicates.

A network 603 exists independently of the network robot and provides communication with servers with which the network robot communicates.

Now, the configuration of the information acquisition system of the sixth embodiment in FIG. 17 will be explained. As shown in FIG. 17, the information acquisition system comprises a link stack section 604, a next acquisition time zone storage section 605, a clock section 606, a transmission/reception section 607, a server monitor section 611, a server communication history storage section 612, and a link extraction section 609.

The link stack section 604 has a data structure capable of storing as many links as needed.

The next acquisition time zone storage section 605 has a structure pairing a link with the next acquisition time zone division of the data indicated by the link and has the function of outputting and updating the next acquisition time zone division of the structure.

The clock section 606 outputs the present time in operation.

The transmission/reception section 607 transmits and receives the data to and from the network 603.

The server monitor section 611 inputs and receives the data to and from the server communication history storage section 612.

The server communication history storage section 612 has a history of information composed of a set of the transmission/reception time zone division between each server and the network robot and any one of "communication abnormal (disconnection)," "communication improper," and "communication proper." The link extraction section 609 extracts a link from the data or a hypertext, part of the data.

Figure 18:
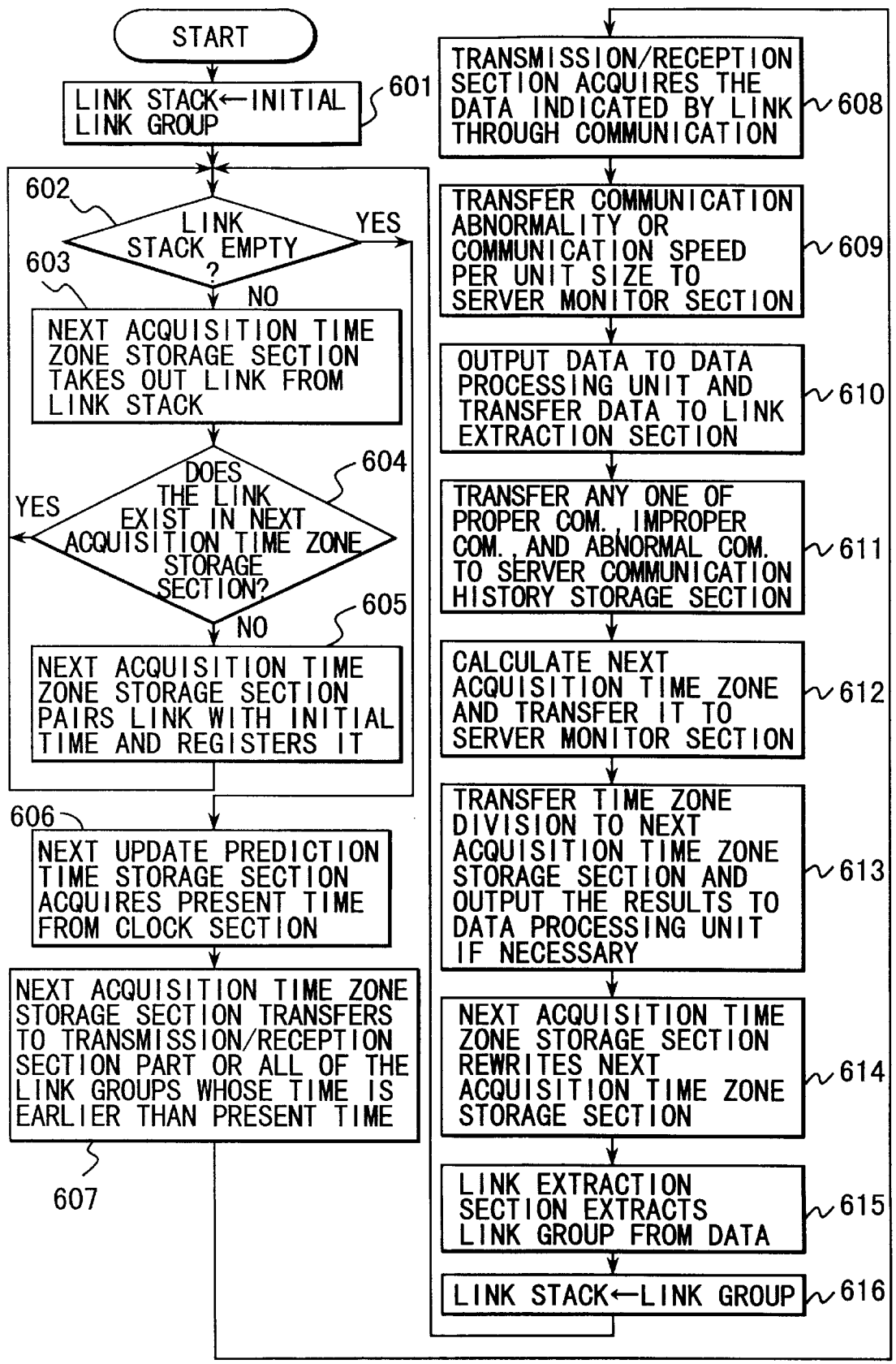
FIG. 18 is a flowchart for the overall operation of the information acquisition system of FIG. 17.

Hereinafter, the operation of the information acquisition system of the sixth embodiment will be descried by reference to FIG. 18.

At step S601, the link input unit 601 transfers the initial link group to the link stack section 604 (step S601).

The link stack section 604 transfers each link group sent in step S601 or step S616 to the next acquisition time zone storage section 605 (steps S602, S603).

If the link transferred at step S603 has not been registered, the next update prediction time storage section 605 pairs the link with the initial time zone division and registers the pair (steps S604, S605).

Next, at step S602, when the data link stack gets empty, the next acquisition time zone storage section 605 gets the present time from the clock section 606 (step S606). Instead of the next acquisition time zone storage section 605 asking the clock section 606 for the present time, the clock section 606 may automatically transfer information on the present time to the next acquisition time zone storage section 605.

The next acquisition time zone storage section 605 transfers to the transmission/reception section 607 part or all of the links having the time zone division corresponding to the time transferred at step S606 (step S608).

The transmission/reception section 607 communicates with the network 603 and tries to acquire the data specified by the link transferred at step S607 (step S608).

Regarding data acquisition, as described in the first embodiment, a default value may be set beforehand and, when it is found before communication or in the course of communication control that data items whose values are larger than the default value are to be acquired, only those from the beginning up to a specific value may be actually acquired. Moreover, of the data items, those including no link may not be acquired, thereby reducing the actually acquired data size.

The transmission/reception section 607 outputs information indicating communication abnormality to the server monitor section 611 as the result at step S608, when the communication mechanism does not present the normal condition, or when the data reference at that time turns out to be impossible, regardless of the data item. In other cases, the transmission/reception section sends the communication speed per communication unit size obtained from the communication time and the acquired data size to the server monitor section (step S609).

Furthermore, the transmission/reception section 607 outputs the data acquired at step S608 to the data processing unit 602 and to the link extraction section 612 (step S612). At that time, the order of output and transfer is not limited.

The order of execution of step S609 and step S610 may be reversed. They may be executed in parallel.

At step S609, when the communication speed per communication unit size is transferred and its value is equal to or larger than a setting value, the server monitor section 611 sends information indicating communication improper to the communication history storage section 612; when its value is smaller than the setting value, the former sends information indicating communication proper to the latter; and when information indicating communication abnormal has been transferred, the former sends information indicating communication abnormal to the latter (step S611).

The communication history storage section 612 adds the information transferred at step S611 together with its time zone division to the history of communication with the server with which it has communicated, calculates a time zone division suitable for the next reference, and sends the result as the next acquisition time zone to the server monitor section 611 (step S612). When no time zone division that fulfills a specific requirement is found, the communication history storage section may transfer information on communication refusal to the server monitor section 611.

The server monitor section 611 transfers the time zone division sent at step S612 to the next acquisition time zone storage section 605.

The time zone division transferred at step S612, the time zone division at step S608, the communication speed per communication unit size, the communication time, or the acquired data size may be outputted to the data processing unit 602, when the data processing unit 602 needs it.

The next acquisition time zone storage section 605 replaces the next acquisition time zone division corresponding to the link sent to the transmission/reception section 607 at step S610 with the next acquisition time zone sent at step S613 (step S614).

The link extraction section 612 extracts the link group from the data transferred at step S609 (step S615) and transfers it to the link stack section 604.

The link stack section 604 stores the transferred link group (step S616).

The processes at steps S615 and S616 may be carried out independently of the processes at steps S611 and S614.

Thereafter, control returns to step S602. As described earlier, the link stack section 604 pairs each of the link groups extracted at step S612 with the initial time and registers the pair in the next acquisition time zone storage section 605, only when the link group has not been registered in the next acquisition time zone storage section 605 (steps S602 to S605).

From this time on, the aforementioned processes are performed repeatedly.

As described above, with the sixth embodiment, update history information on each data item is accumulated. On the basis of the accumulated pieces of update history information, the update characteristic of each data item is estimated and the reference time zone is scheduled, thereby realizing data reference at the same frequency as that of update of each data item.

Furthermore, the process of referring to unupdated data items unnecessarily can be suppressed beforehand. This helps improve the efficiency of data acquisition.

Moreover, the communication characteristic is grasped by accumulating the communication conditions at the time of each data acquisition. By scheduling the reference time zone, taking into account the communication characteristic, the data and the server holding the data are referred to in the time zone best suited for the reference. This helps improve the efficiency of data acquisition.

As described using the first to sixth embodiments, with the present invention, on the basis of update history information on each data item, the reference time or time zone for each data item is scheduled, thereby realizing data reference at the same frequency as that of update of each data item.

Furthermore, with the present invention, on the basis of update history information on each data item, the reference time or time zone for each data item is scheduled, thereby suppressing unnecessary reference to unupdated data items beforehand. This helps improve the efficiency of data acquisition.

Moreover, with the present invention, on the basis of the communication characteristic at each data acquisition, the reference time or time zone for each data item is scheduled, thereby realizing reference to the data and the server holding the data at the time or in the time zone best suited for the reference. This helps improve the efficiency of data acquisition.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of acquiring a plurality of data from a plurality of servers, the plurality of data being specified by a plurality of links, the method comprising the steps of:
   acquiring one of the plurality of data from one of the plurality of servers, said one of the plurality of data being specified by one of the plurality of links;
   determining how frequently said one of the plurality of data is updated in said one of the plurality of servers, wherein the determining step includes a substep of determining whether update time information is included in the acquired data;
   storing time information in correspondence with said one of the plurality of links, the time information indicating when to acquire an updated version of said one of the plurality of data, responsive to a result obtained by the determining step, wherein the storing step includes a substep of calculating a next acquisition time according to the update time information when the update time information is included in the acquired data; and
   acquiring said updated version of said one of the plurality of data from said one of the plurality of servers in accordance with the time information.

2. The method of claim 1, wherein the step of acquiring one of the plurality of data includes a substep of acquiring the data via a network.

3. The method of claim 2, further including the steps of calculating an update interval from the update time information and calculating the next acquisition time from the calculated update interval and the time information.

4. The method of claim 2, further including the steps of calculating an elapsed time related to the step of acquiring one of the plurality of data, calculating an update interval from the update time information, an calculating the next acquisition time from the calculated elapsed time, the update interval and the time information.

5. The method of claim 2, further including the step of calculating a frequency of update of the data specified by the link from the update time information, wherein the storing step includes a substep of calculating the next acquisition time from the calculated frequency of update time and the update information.

6. The method of claim 2, wherein the determining step includes a substep of classifying the acquired data to obtain a classification result, said method further including the steps of calculating a frequency of update of the data specified by the link from the update time information, and calculating the next acquisition time from the classification result, the calculated frequency of time update, and the update information.

7. The method of claim 2, wherein the step of acquiring one of the plurality of data includes a substep of connecting to a network for accessing a server to acquire the data, and which further comprises the step of notifying an information processing unit of a server access state at the step of acquiring one of the plurality of data.

8. The method of claim 1, wherein the determining step also determines how fast said one of the plurality of data was acquired via a network from said one of the plurality of servers, and the storing step stores the time information responsive to conditions of the network and said one of the plurality of servers obtained by the determining step.

9. A computer program product for use in a data acquisition system for causing a computer to acquire a plurality of data from a plurality of servers, the plurality of data being specified by a plurality of links, the computer program product having:

first instruction means for causing the computer to acquire one of the plurality of data from one of the plurality of servers in accordance with stored time information, said one of the plurality of data being specified by one of the plurality of links;

second instruction means for causing the computer to determine how frequently said one of the plurality of data is updated in said one of the plurality of servers, according to said one of the plurality of data acquired by the first instruction means, wherein the second instruction means causes the computer to determine whether update time information is included in the acquired data;

third instruction means for causing the computer to update the time information stored in correspondence with said one of the plurality of links, such that the time information indicates when to acquire an updated version of said one of the plurality of data, responsive to a result obtained by the second instruction means, wherein the third instruction means causes the computer to calculate a next acquisition time according to the update time information when the update time information is included in the acquired data.

10. The computer program product of claim 9, wherein the first instruction means causes the computer to acquire the data via a network.

11. The computer program product of claim 10, wherein the third instruction means causes the computer to calculate an update interval from the update information and the next acquisition time from the calculated update interval and the time information.

12. The computer program product of claim 10, wherein the third instruction means causes the computer to calculate an elapsed time related to the data acquisition, an update interval from the update information, and the next acquisition time from the calculated elapsed time, update interval, and the time information.

13. The computer program product of claim 10, wherein the third instruction means causes the computer to calculate a frequency of update of the data specified by the link from the update information, and the next acquisition time from the calculated frequency of update and the update information.

14. The computer program product of claim 10, wherein the third instruction means causes the computer to classify the acquired data, calculate a frequency of update of the data specified by the link from the update information, and calculate the next acquisition time from the classification result, the calculated frequency of update, and the update information.

15. The computer program product of claim 10, wherein the first instruction means causes the computer to connect to a network for accessing a server to acquire the data, further comprising fourth instruction means for causing the computer to notify an information processing unit of a server access state when the data is acquired.

16. The computer program product of claim 9, wherein the second instruction means causes the computer to determine how fast said one of the plurality of data was acquired via a network from said one of the plurality of servers, and the third instruction means causes the computer to calculate the time information responsive to conditions of the network and said one of the plurality of servers obtained by the second instruction means.

17. A system of acquiring a plurality of data from a plurality of servers, the plurality of data being specified by a plurality of links, the system comprising:

an acquisition unit configured to acquire one of the plurality of data from one of the plurality of servers, said one of the plurality of data being specified by one of the plurality of links;

a determination unit configured to determine how frequently said one of the plurality of data is updated in said one of the plurality of servers;

a storage unit configured to update time information stored in correspondence with said one of the plurality of links in accordance with a time needed for acquiring said one of the plurality of data from said one of the plurality of servers, wherein the time information indicates when to acquire an updated version of said one of the plurality of data, responsive to a result obtained by the determination unit.

* * * * *